United States Patent
Fischer

(10) Patent No.: US 10,317,509 B2
(45) Date of Patent: Jun. 11, 2019

(54) PRS-BASED TERRESTRIAL BEACON SYSTEM (TBS) IMPLEMENTATIONS

(71) Applicant: QUALCOMM Incorporated, San Diego, CA (US)

(72) Inventor: Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 15/259,301

(22) Filed: Sep. 8, 2016

(65) Prior Publication Data

US 2017/0285132 A1  Oct. 5, 2017

Related U.S. Application Data

(60) Provisional application No. 62/372,730, filed on Aug. 9, 2016, provisional application No. 62/315,855, filed on Mar. 31, 2016.

(51) Int. Cl.
*G01S 5/10* (2006.01)
*G01S 5/02* (2010.01)
(Continued)

(52) U.S. Cl.
CPC .............. *G01S 5/10* (2013.01); *G01S 5/0226* (2013.01); *G01S 5/0252* (2013.01);
(Continued)

(58) Field of Classification Search
CPC ........ G01S 5/10; G01S 5/0226; G01S 5/0252; H04L 5/0007; H04L 5/0048; H04W 64/00; H04W 72/042; H04W 72/12
(Continued)

(56) References Cited

U.S. PATENT DOCUMENTS 9,510,328 B2 *  11/2016  Krishnamurthy ..... H04L 5/0053
2010/0284291 A1  11/2010  Perras et al.
(Continued)

OTHER PUBLICATIONS

QUALCOMM Inc. (Nov. 15, 2015). Introduction of PRS-based Terrestrial Beacon Systems. 3rd Generation Partnership Project (3GPP) TSG-RAN WG1 Meeting #83, R1-157062. Retrieved from http://portal.3gpp.org/ngppapp/CreateTdoc.aspx?mode=view&contributionId=668693.
(Continued)

*Primary Examiner* — Harry K Liu
(74) *Attorney, Agent, or Firm* — Bala Ramasamy; Hunter Clark PLLC

(57) ABSTRACT

Disclosed are methods, devices, systems, apparatus, servers, computer-/processor-readable media, and other implementations, including an example method to facilitate position determination operations that includes producing, by a location transmission unit (LTU) configured for downlink-only communication, one or more subframes comprising one or more LTU broadcast positioning reference signals. The LTU is detectable by at least one mobile wireless device based on LTU broadcast control signals, with at least some of the LTU broadcast control signals being transmittable by a different wireless node than the LTU. The method also includes transmitting, by the LTU, the one or more LTU broadcast positioning reference signals usable for determination of a position of at least one mobile wireless device, with the one or more LTU broadcast positioning reference signals being detectable by the at least one mobile wireless device.

30 Claims, 12 Drawing Sheets

(51) Int. Cl.
*H04L 5/00* (2006.01)
*H04L 27/26* (2006.01)
*H04W 72/04* (2009.01)
*H04W 72/12* (2009.01)
*H04W 64/00* (2009.01)
*H04W 88/02* (2009.01)

(52) U.S. Cl.
CPC .......... *H04L 5/0007* (2013.01); *H04L 5/0048* (2013.01); *H04L 27/261* (2013.01); *H04W 64/00* (2013.01); *H04W 72/042* (2013.01); *H04W 72/12* (2013.01); *H04W 88/02* (2013.01)

(58) Field of Classification Search
USPC .......................................... 342/464
See application file for complete search history.

(56) References Cited

U.S. PATENT DOCUMENTS

| | | | | |
|---|---|---|---|---|
| 2012/0051445 | A1* | 3/2012 | Frank | H04L 5/0048 375/259 |
| 2012/0122472 | A1* | 5/2012 | Krishnamurthy | H04L 5/0053 455/456.1 |
| 2012/0252487 | A1* | 10/2012 | Siomina | H04W 24/10 455/456.1 |
| 2012/0257562 | A1* | 10/2012 | Kim | H04W 4/06 370/312 |
| 2015/0029903 | A1* | 1/2015 | Chen | H04W 72/0446 370/277 |
| 2015/0296359 | A1 | 10/2015 | Edge et al. | |
| 2015/0304994 | A1 | 10/2015 | Kim et al. | |
| 2015/0327227 | A1* | 11/2015 | Soldati | H04L 5/0053 370/330 |
| 2015/0365152 | A1 | 12/2015 | Frenne et al. | |
| 2016/0219542 | A1 | 7/2016 | Sezgin et al. | |
| 2016/0248563 | A1* | 8/2016 | Behravan | H04L 5/0087 |
| 2017/0288830 | A1 | 10/2017 | Fischer | |
| 2018/0019857 | A1* | 1/2018 | Kazmi | H04L 5/1469 |

OTHER PUBLICATIONS

QUALCOMM Inc. (Nov. 16-20, 2015). Introduction of PRS-based Terrestrial Beacon Systems (PRS-TBS-Discussion_and_Stage2). 3rd Generation Partnership Project (3GPP) TSG-RAN WG2 Meeting #92, R2-156119. Retrieved from http://www.3gpp.org/DynaReport/TDocExMtg-R2-92--31265.htm.

3rd Generation Partnership Project (3GPP). (Sep. 25, 2015). Study on indoor positioning enhancements for UTRA and LTE. Technical Report (TR 37.857). Release 13. Retrieved from https://portal.3gpp.org/desktopmodules/Specifications/SpecificationDetails.aspx?specificationId=2629.

International Search Report and Written Opinion—PCT/US2017/017335—ISA/EPO—May 10, 2017—13 pgs.

* cited by examiner

PRS-BASED TERRESTRIAL BEACON SYSTEM (TBS) IMPLEMENTATIONS

CROSS-REFERENCE TO RELATED APPLICATIONS

This application claims the benefit of and priority to U.S. Provisional Application Ser. No. 62/372,730, entitled "PRS-BASED TERRESTRIAL BEACON SYSTEM (TBS) IMPLEMENTATION," filed Aug. 9, 2016, and U.S. Provisional Application Ser. No. 62/315,855, entitled "PRS-BASED TERRESTRIAL BEACON SYSTEM (TBS) IMPLEMENTATION," filed Mar. 31, 2016, which are assigned to the assignee hereof, and expressly incorporated herein by reference.

BACKGROUND

Position determination procedures include timing-based procedures in which timing information for signals transmitted from various wireless devices/nodes are received, measured, and used to derive location information. For example, in observed-time-difference of-arrival (OTDOA) based positioning, a mobile station may measure time differences in received signals from a plurality of base stations. Because positions of the base stations are known, the observed time differences may be used to calculate the location of the mobile device. To further help location determination, Positioning Reference Signals (PRS) may be provided in order to improve OTDOA positioning performance (and/or performance of other position determination procedures). The measured time difference of arrival of the PRS from a reference cell (e.g. the serving cell) and one or more neighboring cells is known as the Reference Signal Time Difference (RSTD). Using the RSTD measurements, the absolute or relative transmission timing of each cell, and the known position(s) of nodes physical transmitting antennas for the reference and neighboring cells, the position of a receiving mobile device may be derived.

SUMMARY

In some variations, an example method to facilitate position determination operations is provided. The method includes producing, by a location transmission unit (LTU) configured for downlink-only communication, one or more subframes comprising one or more LTU broadcast positioning reference signals. The LTU is detectable by at least one mobile wireless device based on LTU broadcast control signals, with at least some of the LTU broadcast control signals being transmittable by a different wireless node than the LTU. The method also includes transmitting, by the LTU, the one or more LTU broadcast positioning reference signals usable for determination of a position of at least one mobile wireless device, with the one or more LTU broadcast positioning reference signals being detectable by the at least one mobile wireless device.

Embodiments of the method may include at least some of the features described in the present disclosure, including one or more of the following features.

The LTU may be configured to support multiple modes of operation, including, for example, 1) a partial standalone mode in which one or more remote nodes, different from the LTU, transmit system information comprising data relating to the LTU while the LTU is configured to operate independently from any network node supporting uplink communication with the at least one mobile wireless device, or 2) an integrated network mode in which the LTU is configured to operate within a network comprising at least one network node supporting uplink communication with the at least one mobile wireless device, with the at least one network node configured to transmit all the LTU broadcast control signals.

The method may further include transmitting, by the LTU while the LTU is operating in the partial standalone mode, a subset of the LTU broadcast control signals.

Transmitting, by the LTU, the subset of the LTU broadcast control signals while operating in the partial standalone mode may include transmitting an LTU primary synchronization signal (PSS) and an LTU secondary synchronization signal (SSS), the LTU SSS derived at least in part based on the LTU PSS and an identification value assigned to the LTU. The LTU PSS and the LTU SSS may be detectable by the at least one mobile wireless device and configured to support determination of LTU frame timing. The LTU SSS may be usable to determine a physical layer identifier for the LTU.

Transmitting, by the LTU, the subset of the LTU broadcast control signals while operating in the partial standalone mode may include deriving, by the LTU, based at least in part on a physical layer identifier for the LTU, an LTU specific reference signal (LRS) comprising data for demodulating signals from the LTU, and transmitting, by the LTU, the LTU LRS.

Transmitting, by the LTU, the subset of the LTU broadcast control signals while operating in the partial standalone mode may include transmitting, by the LTU, a broadcast channel information signal comprising data representative of, for example, channel bandwidth for the LTU, and/or an LTU system frame number.

Transmitting the one or more LTU broadcast positioning reference signals may include scheduling the one or more LTU broadcast positioning reference signals within at least one transmission sub-frame, the at least one transmission sub-frame associated with a plurality of symbols that are each associated with a plurality of sub-carriers.

Scheduling the one or more LTU broadcast positioning reference signals within the at least one transmission sub-frame, while the LTU is operating in an integrated network mode in which the LTU is configured to operate within a network comprising at least one network node supporting uplink communication with the at least one mobile wireless device, may include making available for scheduling of at least one of the one or more LTU broadcast positioning reference signals all of the plurality of symbols within the at least one transmission sub-frame, and selecting at least one of the all of the plurality of symbols available for the scheduling of the at least one of the one or more LTU broadcast positioning reference signals.

Scheduling the one or more LTU broadcast positioning reference signals within the at least one transmission sub-frame, while the LTU is operating in a partial standalone mode in which the LTU is configured to operate independently from any network node supporting uplink communication with the at least one mobile wireless device, and in which one or more remote nodes, different from the LTU, transmit system information comprising data relating to the LTU, may include making available for scheduling of the at least one of the one or more LTU broadcast positioning reference signals a subset of the plurality of symbols that are within the at least one transmission sub-frame, with at least one of the plurality of symbols being allocated for transmission of control signaling for the LTU.

Producing the one or more LTU broadcast positioning reference signals may include generating a scrambling sequence using a pseudo-random sequence generator, with the pseudo-random sequence generator being initialized with a 31-bit initialization seed, $c'_{init}$, generated according to:

$$c'_{init} = 2^{28} \cdot \left\lfloor \frac{N_{ID}^{LTU}}{512} \right\rfloor + 2^{10} \cdot (7 \cdot (n_s + 1) + l + 1) \cdot (2 \cdot (N_{ID}^{LTU} \bmod 512) + 1) + 2 \cdot (N_{ID}^{LTU} \bmod 512) + N_{CP},$$

where $N_{ID}^{LTU}$ is a value derived, at least in part, based on an identifier of the LTU, $N_{CP}$ equals 1 for normal cyclic prefix and 0 for extended cyclic prefix, $n_s$ is a slot number within a radio frame with a value in a range of 0-19, and l is an OFDM symbol number within a slot.

Producing the one or more LTU broadcast positioning reference signals may include producing the one or more LTU broadcast positioning reference signals based, in part, on a muting pattern indicated by a PRS muting bitstring with a bitstring-length of at least 32 bits.

Transmitting the one or more LTU broadcast positioning reference signals may include transmitting the one or more LTU broadcast positioning reference signals to support observed time difference of arrival (OTDOA) positioning operations.

OTDOA assistance data, used to support the OTDOA positioning operations, may include an indicator to indicate to the at least one mobile wireless device that the OTDOA assistance is being provided for the LTU when the LTU is operating in an integrated network mode of operation in which the LTU is configured to operate within a network comprising at least one network node supporting uplink communication with the at least one mobile wireless device, with the at least one network node configured to transmit all the LTU broadcast control signals.

In some variations, a location transmission unit (LTU) is provided that includes one or more processors, configured to produce one or more subframes comprising one or more LTU broadcast positioning reference signals, with the LTU being configured for downlink-only communication. The LTU is detectable by at least one mobile wireless device based on LTU broadcast control signals, with at least some of the LTU broadcast control signals being transmittable by a different wireless node than the LTU. The LTU also includes a transmitter, coupled to the one or more processors, configured to transmit the one or more LTU broadcast positioning reference signals usable for determination of a position of at least one mobile wireless device, with the one or more LTU broadcast positioning reference signals being detectable by the at least one mobile wireless device.

Embodiments of the LTU may include at least some of the features described in the present disclosure, including at least some of the features described above in relation to the method.

In some variations, an apparatus to facilitate position determination operations is provided that includes means for producing, by a location transmission unit (LTU) configured for downlink-only communication, one or more subframes comprising one or more LTU broadcast positioning reference signals. The LTU is detectable by at least one mobile wireless device based on LTU broadcast control signals, with at least some of the LTU broadcast control signals being transmittable by a different wireless node than the LTU. The apparatus further includes means for transmitting, by the LTU, the one or more LTU broadcast positioning reference signals usable for determination of a position of at least one mobile wireless device, with the one or more LTU broadcast positioning reference signals being detectable by the at least one mobile wireless device.

Embodiments of the apparatus may include at least some of the features described in the present disclosure, including at least some of the features described above in relation to the method and the LTU, as well as one or more of the following features.

The LTU may be configured to support multiple modes of operation, including, for example, 1) a partial standalone mode in which one or more remote nodes, different from the LTU, transmit system information comprising data relating to the LTU while the LTU is configured to operate independently from any network node supporting uplink communication with the at least one mobile wireless device, or 2) an integrated network mode in which the LTU is configured to operate within a network comprising at least one network node supporting uplink communication with the at least one mobile wireless device, with the at least one network node configured to transmit all the LTU broadcast control signals.

The apparatus may further include means for transmitting, by the LTU while the LTU is operating in the partial standalone mode, a subset of the LTU broadcast control signals, including, for example: 1) means for transmitting an LTU primary synchronization signal (PSS) and an LTU secondary synchronization signal (SSS), the LTU SSS derived at least in part based on the LTU PSS and an identification value assigned to the LTU, with the LTU PSS and the LTU SSS are detectable by the at least one mobile wireless device and configured to support determination of LTU frame timing, and with the LTU SSS being usable to determine a physical layer identifier for the LTU, 2) means for deriving, by the LTU, based at least in part on a physical layer identifier for the LTU, an LTU specific reference signal (LRS) comprising data for demodulating signals from the LTU, and means for transmitting, by the LTU, the LTU LRS, and/or 3) means for transmitting, by the LTU, a broadcast channel information signal comprising data representative of, for example, channel bandwidth for the LTU, and/or an LTU system frame number.

The means for transmitting the one or more LTU broadcast positioning reference signals may include means for scheduling the one or more LTU broadcast positioning reference signals within at least one transmission sub-frame, the at least one transmission sub-frame associated with a plurality of symbols that are each associated with a plurality of sub-carriers.

The means for scheduling the one or more LTU broadcast positioning reference signals within the at least one transmission sub-frame, while the LTU is operating in an integrated network mode in which the LTU is configured to operate within a network comprising at least one network node supporting uplink communication with the at least one mobile wireless device, with the at least one network node configured to transmit all the LTU broadcast control signals, may include means for making available for scheduling of at least one of the one or more LTU broadcast positioning reference signals all of the plurality of symbols within the at least one transmission sub-frame, and means for selecting at least one of the all of the plurality of symbols available for the scheduling of the at least one of the one or more LTU broadcast positioning reference signals.

The means for scheduling the one or more LTU broadcast positioning reference signals within the at least one transmission sub-frame, while the LTU is operating in a partial standalone mode in which the LTU is configured to operate independently from any network node supporting uplink communication with the at least one mobile wireless device, and in which one or more remote nodes, different from the LTU, transmit system information comprising data relating to the LTU, may include making available for scheduling of the at least one of the one or more LTU broadcast positioning reference signals a subset of the plurality of symbols that are within the at least one transmission sub-frame, with at least one of the plurality of symbols being allocated for transmission of control signaling for the LTU.

The means for producing the one or more LTU broadcast positioning reference signals may include generating a scrambling sequence using a pseudo-random sequence generator, with the pseudo-random sequence generator being initialized with a 31-bit initialization seed, $c'_{init}$, generated according to:

$$c'_{init} = 2^{28} \cdot \left\lfloor \frac{N_{ID}^{LTU}}{512} \right\rfloor + 2^{10} \cdot (7 \cdot (n_s + 1) + l + 1) \cdot (2 \cdot (N_{ID}^{LTU} \bmod 512) + 1) + 2 \cdot (N_{ID}^{LTU} \bmod 512) + N_{CP},$$

where $N_{ID}^{LTU}$ is a value derived, at least in part, based on an identifier of the LTU, $N_{CP}$ equals 1 for normal cyclic prefix and 0 for extended cyclic prefix, $n_s$ is a slot number within a radio frame with a value in a range of 0-19, and l is an OFDM symbol number within a slot.

The means for producing the one or more LTU broadcast positioning reference signals may include means for producing the one or more LTU broadcast positioning reference signals based, in part, on a muting pattern indicated by a PRS muting bitstring with a bitstring-length of at least 32 bits.

The means for transmitting the one or more LTU broadcast positioning reference signals may include means for transmitting the one or more LTU broadcast positioning reference signals to support observed time difference of arrival (OTDOA) positioning operations.

OTDOA assistance data, used to support the OTDOA positioning operations, may include an indicator to indicate to the at least one mobile wireless device that the OTDOA assistance is being provided for the LTU when the LTU is operating in an integrated network mode of operation in which the LTU is configured to operate within a network comprising at least one network node supporting uplink communication with the at least one mobile wireless device, with the at least one network node configured to transmit all the LTU broadcast control signals.

In some variations, a non-transitory computer readable media is provided, that is programmed with instructions, executable on a processor, to produce, by a location transmission unit (LTU) configured for downlink-only communication, one or more subframes comprising one or more LTU broadcast positioning reference signals. The LTU is detectable by at least one mobile wireless device based on LTU broadcast control signals, with at least some of the LTU broadcast control signals being transmittable by a different wireless node than the LTU. The computer readable media includes further instructions to transmit, by the LTU, the one or more LTU broadcast positioning reference signals usable for determination of a position of at least one mobile wireless device, with the one or more LTU broadcast positioning reference signals being detectable by the at least one mobile wireless device.

Embodiments of the non-transitory computer readable media may include at least some of the features described in the present disclosure, including at least some of the features described above in relation to the method, the LTU, and the apparatus.

Other and further objects, features, aspects, and advantages of the present disclosure will become better understood with the following detailed description of the accompanying drawings.

BRIEF DESCRIPTION OF THE DRAWINGS

Like reference symbols in the various drawings indicate like elements, in accordance with certain example implementations.

DETAILED DESCRIPTION

Figure 1:
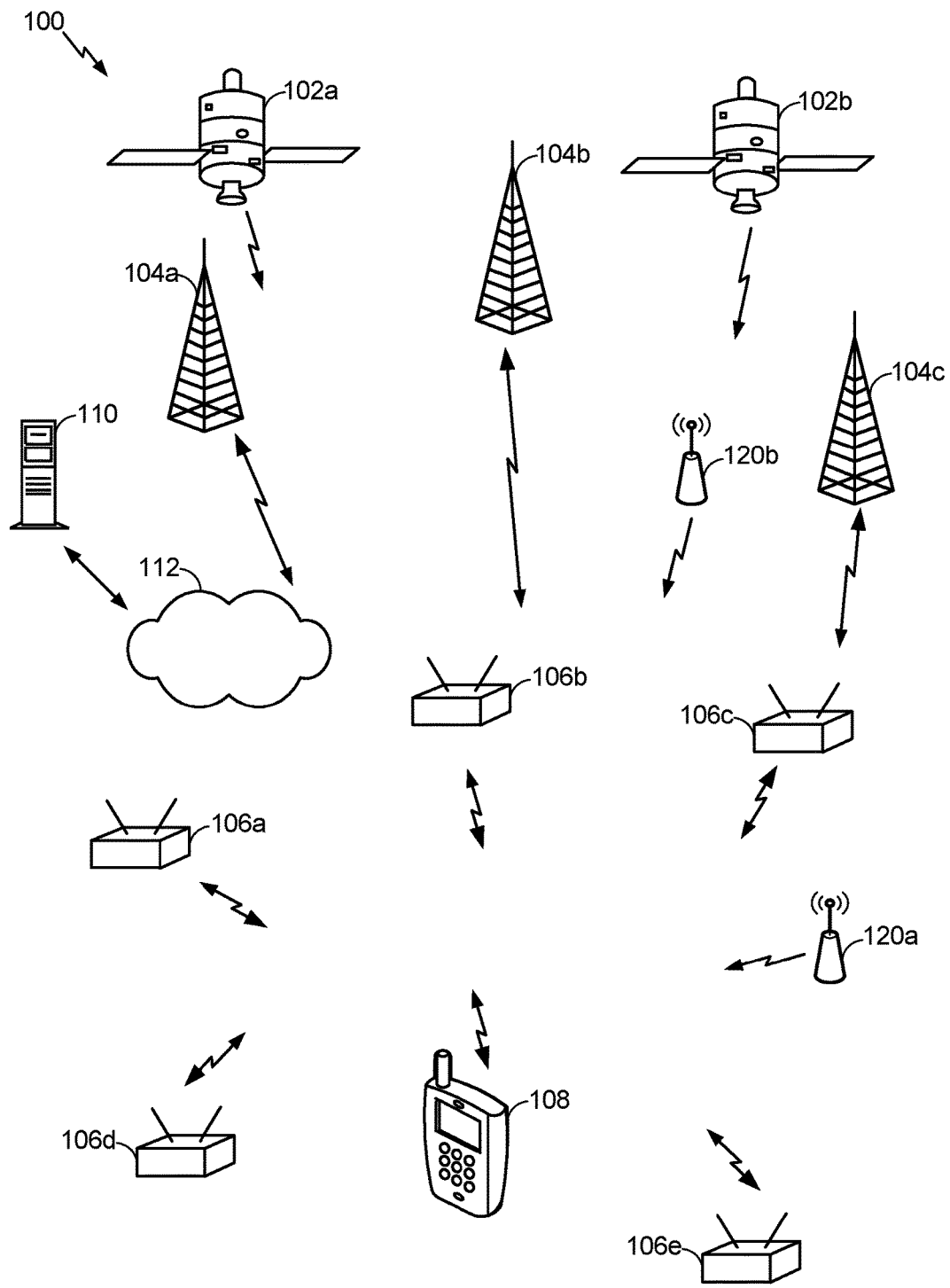
FIG. 1 is a schematic diagram of an example operating environment that includes a mobile wireless device in communication with one or more wireless devices, including with a location transmission unit (LTU) of a terrestrial beacon system (TBS).

Described herein are methods, systems, devices, computer readable media, and other implementations, including a method, generally performed at a network node, to facilitate position determination operations. Various embodiments include producing, by a location transmission unit (LTU) configured for downlink-only communication, one or more subframes comprising one or more LTU broadcast positioning reference signals (PRS), with the LTU being detectable by at least one mobile wireless device based on LTU broadcast control signals, and with at least some of the LTU broadcast control signals being transmittable by a different wireless node than the LTU, and transmitting, by the LTU, the one or more LTU broadcast positioning reference signals usable for determination of a position of at least one mobile wireless device. The one or more LTU broadcast positioning reference signals are detectable by the at least one mobile wireless device.

An LTU (also referred to as a positioning beacon or as a PRS transmission point (PRS-TP)) is a node configured to provide signals for positioning purposes only, and may be part of a terrestrial beacon system (TBS). A TBS generally includes a network of ground-based transmitters, broadcasting signals for positioning purposes. TBS positioning technologies may support standalone, UE-based, and UE-assisted positioning modes. In standalone positioning mode, the UE performs TBS signal measurements and calculates its own location without assistance data from a location server (such as a Serving Mobile Location Center (SMLC)). In UE-based positioning mode, the UE performs TBS signal measurements and calculates its own location where assistance data useful or essential to one or both of these functions is provided to the UE by a location server. In UE-assisted positioning mode, the UE performs TBS signal measurements and provides these measurements to a location server for computation of a location estimate by the location server. The location server may provide assistance data to the UE to enable TBS position measurements and/or improve measurement performance. LTUs can be additional elements in a positioning network architecture, such as the Evolved UMTS Terrestrial Radio Access Network (E-UTRAN). An LTU node may not need an interface in E-UTRAN and/or core network (CN). In some embodiments, depending on an LTU's mode of operation, the LTU may transmit at least a subset of the control signals (e.g., LTU broadcast control signals). The LTU may be configured to support multiple modes of operation, including a full standalone mode of operation in which all broadcast control signals that are to allow receiving devices to detect the LTU are transmitted by the LTU and/or a partial-standalone mode of operation in which at least a subset of broadcast control signals that are required to allow receiving devices to detect the LTU (the broadcast control signals may comprise signal-acquisition signaling, system frame number (SFN) timing information signaling, assistance data such as TBS system information, and/or other types of control data) are transmitted by the LTU. However, in implementation in which at least some of the LTU broadcast control signals are transmitted by a different wireless node(s) than the LTU, the full standalone mode would not be used. The LTU also supports a network integrated mode of operation in which control signals are generally transmitted by another node (i.e., different from the LTU node), and the LTU itself, in the network integrated mode, does not transmit control signals (but rather, transmits PRS signals only).

Thus, two general deployment options for LTUs are possible: 1) the LTUs can be integrated in a mobile network operator's (MNO's) OTDOA network, and deployed where needed to provide additional OTDOA coverage, and 2) the LTUs can be deployed as an overlay to the operator's network; e.g., deployed, operated and maintained by a TBS Operator or TBS Service Provider. The LTUs may operate on a standalone/dedicated TBS carrier, or on a shared carrier, such as a 3GPP Long Term Evolution (LTE) carrier. A standalone TBS carrier could be common to all MNOs in an area. In case of a standalone carrier, all subframes could be dedicated to PRS transmission. LTUs can use a subset of the LTE radio interface, where this subset depends on the LTU operation/deployment scenario.

Also disclosed are systems, devices, apparatus, media, and other implementations that include a method, generally performed at a mobile wireless device, to facilitate position determination operations, and that includes receiving, at a mobile wireless device, broadcast control signals for a location transmission unit (LTU) configured for downlink-only communication, with at least some of the broadcast control signals being transmittable by a different wireless node than the LTU. The method also includes detecting the LTU, by the mobile wireless device, based on the broadcast control signals, detecting, by the mobile wireless device, upon detection of the LTU based on the broadcast control signals, one or more LTU broadcast positioning reference signals transmitted by the LTU, and determining position information for the mobile wireless device based on the one or more LTU broadcast positioning reference signals detected by mobile wireless device. In some embodiments, receiving the broadcast control signals, while the LTU is in partial standalone mode, may include receiving from the LTU, by the mobile wireless device, an LTU primary synchronization signal (PSS) and an LTU secondary synchronization signal (SSS), with the LTU SSS being derived at least in part based on the LTU PSS and an identification value assigned to the LTU.

With reference to FIG. 1, shown is a schematic diagram of an example operating environment 100 that includes a mobile wireless device (also referred to as a UE or as a mobile station) 108 in communication with one or more wireless devices, including with a location transmission unit (LTU) (also referred to as positioning beacon or PRS-TP) 120a and/or an LTU 120b, both configured for downlink-only communication, which may be part of a terrestrial beacon system (TBS). The various wireless devices of FIG. 1 may be configured to communicate according to one or more communication protocols. As will be discussed in greater detail below, the various wireless devices of FIG. 1, including, the mobile device 108 and the LTU's 120a-b, may be configured to support observed time difference of arrival (OTDOA) positioning determination functionality (and/or position determination functionality based on other timing and signal detection) based on, at least in part, positioning reference signals (PRS) transmitted by the LTU's 120a and/or 120b. In some embodiments, one or more of the LTU's 120a-b may be integrated in a mobile network operator's OTDOA network (e.g., deployed in situations where additional OTDOA positioning coverage may be needed), or deployed as an overlay to the operator's network (e.g., deployed, operated, and maintained by a TBS operator or TBS service provider).

Positioning reference signals, which have been defined (e.g., in relation to base station (eNB) transmissions) in 3GPP Long Term Evolution (LTE) Release-9, may be transmitted (e.g., by a node such as a base station, or by an LTU) in special positioning sub-frames that are grouped into positioning occasions. For example, in LTE, the positioning occasion, $N_{PRS}$ can include 1, 2, 4, or 6 consecutive positioning sub-frames and occurs periodically at, for example, 160, 320, 640, or 1280 millisecond intervals. The positioning occasions recur with some pre-determined PRS periodicity denoted $T_{PRS}$. In some embodiments, $T_{PRS}$ may be measured in terms of the number of sub-frames between the start of consecutive positioning occasions. Within each positioning occasion, PRSs are generally transmitted with a constant power. PRS can also be transmitted with zero power (i.e., it can be muted). Muting, which turns off a regularly scheduled PRS transmission, may be useful when PRS patterns between cells overlap. Muting aids PRS detection by the mobile device. Muting may be viewed as the non-transmission of a PRS for a given positioning occasion in a particular cell. Muting patterns may be signaled to a mobile device using bitstrings. For example, in a bitstring signaling a muting pattern, if a bit at position j is set to '0', then the mobile device may infer that the PRS is muted for the $j^{th}$ positioning occasion. PRS configuration and muting may be defined with reference to the System Frame Number (SFN) of a cell that transmits PRS. PRS instances, for the first sub-frame of downlink sub-frames, satisfy $(10 \times n_f + \lfloor n_s /$ 2$]-\Delta_{PRS}$)mod T$_{PRS}$=0 where, n$_f$ is the SFN with 0≤SFN≤1023, n$_s$ is the slot number of the radio frame with 0≤n$_s$≤19, T$_{PRS}$ is the PRS period, and $\Delta_{PRS}$ is the cell-specific sub-frame offset. The first bit of the PRS muting sequence corresponds to the first PRS positioning occasion that starts at SFN=0. To improve detectability of PRS, positioning sub-frames may be low-interference sub-frames that are transmitted without user data channels. As a result, in synchronized networks, PRSs may receive interference from other cell PRSs with the same PRS pattern index (i.e., with the same frequency shift vshift), but not from data transmissions. The frequency shift, in LTE, for example, is defined as a function of the Physical Cell Identifier (PCI) resulting in an effective frequency re-use factor of 6. The PRS configuration parameters such as the number of consecutive positioning sub-frames, periodicity, muting pattern, etc., may be configured by a network and may be signaled to a mobile device as part of the OTDOA assistance data. For example, LPP or LPPe messages between a mobile device and a server (e.g., a location server) may be used to transfer location assistance data that includes OTDOA assistance data. OTDOA assistance data may include reference cell information and neighbor cell lists. The reference cell and neighbor cell lists may each contain the PCIs of the cells as well as PRS configuration parameters for the cells. As will described in greater detail below, similar PRS signaling may also be implemented for nodes such as LTU's (e.g., the LTU's 120*a* and 120*b*) described herein.

With continued reference to FIG. 1, the mobile device 108 (as well as any other device depicted in FIG. 1) may be configured to operate and interact with multiple types of other communication systems/devices, including local area network devices (or nodes), such as WLAN for indoor communication, femtocells, Bluetooth® wireless technology-based transceivers, and other types of indoor communication network nodes, wide area wireless network nodes (e.g., base stations, evolved NodeBs (eNBs), etc.), satellite communication systems, other mobile devices, etc., and as such the mobile device 108 may include one or more interfaces to communicate with the various types of communications systems. The various devices of FIG. 1 may be configured to establish and operate according to any number of communication protocols, including, for example, a long-term evolution positioning protocol (LPP) in which a location server, which may include a wireless communication module (e.g., a wireless transceiver), or which may be in communication with a wireless device, facilitates location determination for a first device (such as the mobile device 108).

As noted, the mobile wireless device 108 may be configured to implement location determination operations according to OTDOA, and may thus be configured to measure signals from reference sources (such as any of the nodes 104*a-c*, 106*a-e*, and/or 120*a-b*) to determine location estimate(s). The mobile device 108 may, in some embodiments, obtain measurements by measuring pseudo-range measurements for satellite vehicles, such as the vehicles 102*a-b* depicted in FIG. 1 and/or OTDOA related measurements from antennas of the various terrestrial (i.e., ground-based nodes). In some embodiments, the OTDOA related measurements taken by the mobile device 108 may be sent to a server, such as a server 110, to derive a position estimate for the mobile device 108. For example, the mobile device 108 may provide location related information, such as location estimates or measurements (e.g., satellite measurements from one or more GNSS, or various network measurements such as RSTDs from one or more network nodes, etc.) to the server 110. In some instances, the mobile device 108 may also obtain a location estimate by using measurements from various nodes transmitting signals, which may be pseudo-range and/or OTDOA related measurements, to derive an estimated position for the mobile device 108. The mobile device 108 may use the difference in the arrival times of downlink radio signals from a plurality of base stations (such as eNB nodes, LTU nodes, etc.) to compute the user's/mobile device's position. For example, if a signal from one cell (e.g., served by one of the base stations depicted in FIG. 1) is received at time $t_1$, and a signal from another cell is received at time $t_2$, then the OTDOA or RSTD is given by $t_2-t_1$. Generally, $t_2$ and $t_1$ are known as time-of-arrival (TOA) measurements. In some embodiments, the mobile device 108 may take the form of a Secure User Plane (SUPL) Enabled Terminal (SET) and may communicate with a server (such as the server 110) and use location assistance data (e.g., provided by a location server via, for example, eNB) to obtain a location estimate for the mobile device 108, which may then be communicated to, for example, some other device. In some embodiments, the mobile device 108 may be configured to facilitate location determination operations by, for example, detecting control signals (e.g., signal-acquisition signaling) transmitted from various nodes, including from an LTU such as the LTUs 120*a* and 120*b* (when the LTU is configured to operate in a mode of operation that requires it to transmit LTU broadcast control signals). In such embodiments, the mobile device may also be configured to detect the LTU based on the received LTU broadcast control signals, receive and/or detect LTU positioning reference signals (PRS) from the detected LTU, and determine position information for the mobile device 108 based on the received LTU PRS transmissions.

As noted, the environment 100 may contain one or more different types of wireless communication systems or nodes. Such nodes include wireless access points (or WAPs) and may include LAN and/or WAN wireless transceivers, including, for example, WiFi base stations, femto cell transceivers, Bluetooth® wireless technology transceivers, cellular base stations, WiMax transceivers, etc. Thus, for example, and with continued reference to FIG. 1, the environment 100 may include the Local Area Network Wireless Access Points (LAN-WAPs) 106*a-e* that may be used for wireless voice and/or data communication with the mobile device 108. The LAN-WAPs 106*a-e* may also be utilized, in some embodiments, as independent sources of position data, e.g., through fingerprinting-based procedures, through implementation of multilateration-based procedures based, for example, on timing-based techniques, signal strength measurements (e.g., RSSI measurements), etc. The LAN-WAPs 106*a-e* can be part of a Wireless Local Area Network (WLAN), which may operate in buildings and perform communications over smaller geographic regions than a WWAN. Additionally in some embodiments, the LAN-WAPs 106*a-e* could also include pico or femto cells. In some embodiments, the LAN-WAPs 106*a-e* may be part of, for example, WiFi networks (IEEE 802.11x), cellular piconets and/or femtocells, Bluetooth® wireless technology Networks, etc. The LAN-WAPs 106*a-e* may, for example, be part of a Qualcomm indoor positioning system (QUIPS). A QUIPS or other like system implementation may, in some embodiments, be configured so that a mobile device may communicate with a server that provides the device with data (such as assistance data, e.g., floor plans, AP MAC IDs, RSSI maps, etc.) for a particular floor or some other region where the mobile device is located. Although five (5)

LAN-WAP's are depicted in FIG. 1, any number of such LAN-WAP's may be used, and, in some embodiments, the environment 100 may include no LAN-WAPs access points at all, or may include a single LAN-WAP.

As further illustrated, the environment 100 may also include a plurality of one or more types of the Wide Area Network Wireless Access Points (WAN-WAPs) 104a-c, which may be used for wireless voice and/or data communication, and may also serve as another source of independent information through which the mobile wireless device 108 may determine its position/location (as noted, the WAN-WAPs may be eNodeB nodes, or some other type of wireless WAN nodes). The WAN-WAPs 104a-c may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104a-104c within the WWAN may operate from fixed positions or may be moveable, and may provide network coverage over large metropolitan and/or regional areas. Although three (3) WAN-WAPs are depicted in FIG. 1, any number of such WAN-WAPs may be used. In some embodiments, the environment 100 may include no WAN-WAPs at all, or may include a single WAN-WAP.

As noted, the environment 100 may also include one or more location transmission units (LTU's) 120a-b, configured for downlink-only communication, that transmit signals (e.g., to broadcast periodic positioning reference signals) that can be detected by receiving wireless devices and be used, at least in part, to facilitate location determination operations. The LTUs 120a-b may be part of Terrestrial Beacon System (TBS). An LTU node may be considered, in some embodiments, to be a "lite" eNB node, configured for downlink (DL) transmission only. As will be discussed in greater detail below, any of the one or more LTU's 120a-b may be configured to operate in one of several operation modes that include, for example, 1) a partial standalone mode in which one or more remote nodes (including the server 110, or a node in communication with the server 110), different from the LTU(s), transmit system information comprising data relating to the LTU (and/or other types of assistance data) while the LTU is configured to operate independently from any network node supporting uplink communication, or 2) an integrated network mode in which the LTU is configured to operate within a network comprising at least one network node supporting uplink communication with the at least one mobile wireless device. In these two modes, at least some of control and reference signals required to detect an LTU is transmitted by a node different than the LTU. Any of the LTU's 120a-b may also be configured to operate in additional modes, including, for example, a full standalone mode in which a particular LTU is configured to operate independently of any non-TBS network (e.g., independently of any network node supporting uplink communication, such as a network defined by a combination of any one of the nodes 104a-c and/or 106a-e in FIG. 1). In a full standalone mode, all control and reference signaling (including TBS system information and/or other types of assistance data) may need to be transmitted by the LTU node. Although two LTU's are illustrated as being deployed in the environment 100, any number of LTU's may be deployed, with each one of them independently configured to one of the various modes of operations for those types of units.

Communication to and from the mobile device 108 (to exchange data, provide location determination operations and services to the device 108, etc.) may be implemented, in some embodiments, using various wireless communication networks and/or technologies such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. In some embodiments, 4G networks, Long Term Evolution ("LTE") networks, Advanced LTE networks, Ultra Mobile Broadband (UMB) networks, and all other types of cellular communications networks may also be implemented and used with the systems, methods, and other implementations described herein. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

In some embodiments, and as further depicted in FIG. 1, the mobile device 108 may also be configured to at least receive information from a Satellite Positioning System (SPS) 102a-b, which may be used as an independent source of position information for the mobile device 108. The mobile device 108 may thus include one or more dedicated SPS receivers configured to receive signals for deriving geo-location information from the SPS satellites. In embodiments in which the mobile device 108 can receive satellite signals, the mobile device may utilize a receiver (e.g., a GNSS receiver) specifically implemented for use with the SPS to extract position data from a plurality of signals transmitted by at least the SPS satellites 102a-b. Transmitted satellite signals may include, for example, signals marked with a repeating pseudo-random noise (PN) code of a set number of chips and may be located on ground based control stations, user equipment and/or space vehicles. The techniques provided herein may be applied to, or otherwise implemented, for use in various other systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with, or otherwise implemented, for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As further shown in FIG. 1, the system 100 may further include the server 110 (e.g., a location server, such as an Evolved Serving Mobile Location Center (E-SMLC) server, or any other type of server) configured to communicate, via a network 112 (e.g., a cellular wireless network, a WiFi network, a packet-based private or public network, such as the public Internet), or via wireless transceivers included with the server 110, with multiple network elements or nodes, and/or mobile wireless devices. For example, the server 110 may be configured to establish communication links with one or more of the WLAN nodes, such as the access points 106a-e, which may be part of the network 112, to communicate data and/or control signals to those access points, and receive data and/or control signals from the access points. Each of the access points 106a-e can, in turn, establish communication links with mobile devices located within range of the respective access points 106a-e. The server 110 may also be configured to establish communication links (directly via a wireless transceiver(s), or indirectly, via a network connection) with one or more of the WWAN nodes, such as the WWAN access points 104a-c depicted in FIG. 1 (which may also be part of the network 112) to establish communication links with one or more of the LTU's 120a-b, and/or to establish communication links with one or more mobile wireless devices (such as the device 108) of FIG. 1. The server 110 may also be configured to at least receive information from satellite vehicles 102a and/or 102b of a Satellite Positioning System (SPS), which may be used as an independent source of position information. In some embodiments, the server 110 may be part of, attached to, or reachable from network 112, and may communicate with the mobile wireless device 108 via the network 112.

In some embodiments, the server 110 may implement such protocols as an LTE Positioning Protocol (LPP) and/or an LTE Positioning Protocol A (LPPa) and/or the LPP Extensions (LPPe) protocol for direct communication and to control and transfer measurements. The LPP and LPPa protocols are defined by 3GPP, and LPPe protocol is defined by the Open Mobile Alliance (OMA). Other communication protocols that may be implemented by the server 110 may include protocols as OMA Secure User plane Location (SUPL), OMA User plane Location Protocol (ULP), etc.

Thus, in some embodiments, the mobile device 108 may be in communication with any one or a combination of the SPS satellites 102a-b, the WAN-WAPs 104a-c, the LAN-WAPs 106a-e, the LTU's 120a-b (the mobile device 108 may only be able to receive downlink communication from the LTU's 120a-b), and/or the server 110. In some embodiments, each of the aforementioned systems can provide an independent information estimate of the position for the mobile device 108 using the same or different techniques. The mobile device may combine the solutions derived from each of the different types of wireless devices to improve the accuracy of the position data. It is also possible to hybridize measurements from different systems to get a position estimate, particularly when there is an insufficient number of measurements from all individual systems or devices to derive a position. For instance, in an urban canyon setting, only one GNSS satellite may be visible and provide adequate measurements (i.e. raw pseudorange and Doppler observables). By itself, this single measurement cannot provide a position solution. However, it could be combined with measurements from urban WiFi APs, WWAN cell ranges, or LTU ranges. When deriving a position using the nodes 104a-c, 106a-e, 120a-b, LTUs 120a-b, the satellites 102a-b, and/or other wireless devices, at least some of the operations/processing may be performed using a server (e.g., a location server, such as the server 110), which may be accessed, in some embodiments, via a network 112.

Figure 2:
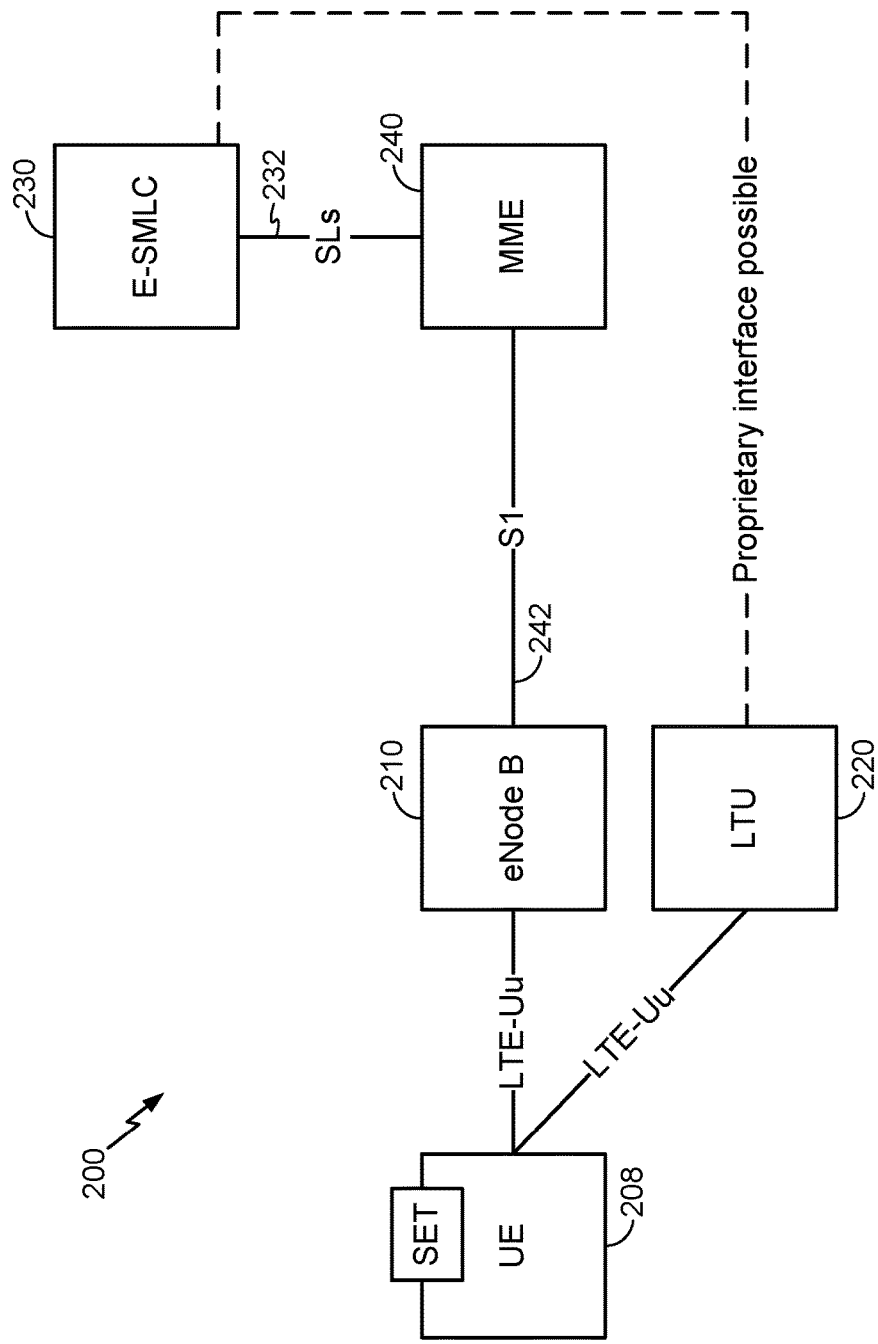
FIG. 2 is a schematic diagram of an example system that includes at least one deployed eNodeB and at least one LTU.

With reference now to FIG. 2, a schematic diagram of a system 200 that includes at least one deployed eNodeB 210 (which may be similar to any of the base station nodes 104a-c of FIG. 1) and at least one LTU 220 (which may be similar to the LTU's 120a-b of FIG. 1) is shown. Although only one eNodeB and one LTU node are shown, any number of such nodes, as well as other types of nodes, may be deployed in the system 200. As shown, communications between the eNodeB 210 and a mobile wireless device 208 (which may be similar in configuration and/or functionality to the mobile wireless device 108 of FIG. 1) occurs over an air interface, such as LTE-Uu air interface. The LTU 220 likewise may use an air interface such as LTE-Uu (and may be configured to use only a subset of the LTE radio interface, with the subset used depending on the specific LTU operation and deployment scenario) in order to communicate with the mobile device 208. As noted, in some embodiments, the LTU may be configured to broadcast downlink signals only, rather than have a two-way communication channel established with, for example, the mobile wireless device 208. The eNodeB 210 is also configured to communicate with a location server, such as an Evolved Serving Mobile Location Center (E-SMLC) server 230 via a Mobility Management Entity (MME) 240. The E-SMLC may also communicate with the LTU 220 via, for example, some proprietary interface. In some implementations, the location server may communicate with a Mobility Management Entity (MME) 240, e.g., via an SLs interface 232, that is configured to perform various control functions such as mobility management, gateway selection, authentication, bearer management, etc. Such an MME system may also be in communication with one or more of the wireless devices depicted in FIG. 2, either directly, via a network, and/or via any of the nodes/devices illustrated in FIG. 2 (e.g., the MME may communicate directly with the eNodeB via an interface S1 242). In some embodiments, an MME may also communicate with a Gateway Mobile Location Center (GMLC; not shown) configured to perform various functions to support location services, interface with external location services (LCS) clients, and provide services such as subscriber privacy, authorization, authentication, billing, etc. A GMLC may include a Home GMLC (H-GMLC), a Visited GMLC (V-GMLC), and/or a Requesting GMLC (R-GMLC). An H-GMLC, V-GMLC, and R-GMLC are not illustrated in FIG. 2. In some embodiments, only the TBS nodes (e.g., the LTU 220 of FIG. 2, or the LTU's 120a-b depicted in FIG. 1) may provide positioning coverage without use of signaling from other non-TB S nodes (such as the eNode B 210 of FIG. 2). The LTU's 220 and 120a-b may operate on a standalone/dedicated TBS carrier (i.e., on a carrier and frequency spectrum that is exclusively allocated to TBS operation), or may operate on a shared carrier (i.e., on a carrier and frequency spectrum where TBS operation is shared with other services, such as LTE communication services). The LTUs may operate in a licensed frequency spectrum/band, or in an unlicensed frequency spectrum/band. In some embodiments, LTU's, such as the LTU 220, may only use a subset of the LTE radio interface.

In order to facilitate position determination functionality based, at least in part, on broadcast downlink signals/messages transmitted by the LTU 220, the user equipment 208 (also referred to as UE, mobile device, or mobile station) may need to be configured for LTU signal acquisition, LTU signal time/frequency tracking, TOA/RSTD estimation, and/or UE position calculation (e.g., for standalone and UE-based positioning modes). To implement this functionality, the subset of the LTE radio interface used for transmissions from the LTU 220 (and/or other deployed LTU's) may include one or more of the following signals and/or channels/links:

a) LTU Synchronization Signals (LTU-SS), which may include primary and secondary synchronization signals that allow for LTU-search and synchronization, and determine the LTU frame timing and physical layer LTU-ID.

b) LTU specific Reference Signals (LRS), which may be similar to cell specific reference signals (CRS) used in LTE, and are required for demodulation (e.g., LTU-BCH, LTU-PDSCH), but could also be used for LTU Enhanced Cell-ID (E-CID) measurements.

c) LTU Physical Broadcast Channel (LTU-PBCH), which allows the UE to obtain LTU bandwidth and LTU system frame number (LTU-SFN). In some embodiments, LTU PRS configuration may be provided via LTU-PBCH (which may avoid the need for LTU-PDSCH transmission).

d) LTU Positioning Reference Signals (LTU-PRS), which are the positioning reference signal transmissions that allow the UE to perform the TOA/RSTD measurements.

e) LTU System Information Blocks (LTU-SIB), which allow the UE to obtain measurement and position calculation information; e.g., PRS configuration, neighbor cell list, LTU location information, etc. This may require support for LTU Physical Downlink Shared Channel (LTU-PDSCH) together with control channels, e.g., LTU Physical Channel Format Indicator Channel (LTU-PCFICH) and LTU Physical Downlink Control Channel (LTU-PDCCH).

The LTU-PCFICH signal/channel may be used to dynamically indicate the size of the control region (e.g., 1, 2, or 3 OFDM symbols) used in an LTU subframe. The control region of an LTU subframe may carry the LTU-PDCCH signal/channel. The LTU-PDCCH signal/channel may be used to carry the LTU Downlink Control Information (DCI). The LTU DCI may contain information which resource blocks carry the desired data (e.g., LTU-SIB data), and what modulation scheme would be required to decode the data.

It should be noted that at least some control channels may not be needed. In some embodiments, the size of the control region used in an LTU subframe may be fixed/predefined (static); for example, it may occupy one OFDM symbol. In such embodiments, the LTU-PCFICH signal/channel may not be needed. Similarly, information about which resource blocks carry the desired data (such as LTU-SIB data) and the modulation scheme used to encode this data may be fixed/predefined. Therefore, in embodiments where a static/fixed LTU DCI is used, the LTU-PDCCH signal/channel may not be needed.

In some embodiments, an example sequence of operations performed at the UE to detect an LTU, and implement positioning functionality may include: 1) LTU frequency acquisition (e.g., the UE tunes its receiver to the LTU carrier frequency), 2) LTU-PSS acquisition (e.g., for time slot synchronization), 3) LTU-SSS acquisition (e.g., to facilitate frame synchronization), 4) with PSS and SSS acquired, physical LTU-ID determination is performed, 5) if LTU reference signal (LRS) location is properly decoded, LTU-PBCH detection is performed, 6) LTU-PCFICH decoding, and detection of how many symbols are allocated for LTU-PDCCH (if not pre-defined), 7) decoding LTU-DCI for LTU-SIB from LTU-PDCCH (if not pre-defined), 8) decoding LTU-SIB (from the LTU-SIB, PRS configuration can be obtained), 9) use PRS for TOA/RSTD estimation, and 10) using the estimated TOAs/RSTDs together with data obtained from LTU-SIB decoding (e.g., LTU antenna locations) to derive the UE location. Additional details regarding the various signal-acquisition signaling (and/or other control signals) communicated by the LTU (or a non-TBS node) to a UE are provided below.

The type, level (e.g., amount), and configuration of signaling (control and positioning signals) required for a particular LTU may depend, in some embodiments, on the particular mode of operation that that particular LTU is set to. For example, a full/standalone PRS-based TBS with self-contained signaling requires all downlink (DL) control signals/channels mentioned above. If TBS nodes (i.e., LTU nodes) are integrated in an OTDOA network, the number of required channels can be reduced.

More particularly, three scenarios can be considered. The first such scenario, corresponding to full/standalone operation of a particular LTU (in which the LTU can operate independently from the Evolved Universal Terrestrial Radio Access Network (E-UTRAN, or LTE node) or any network node supporting uplink communication), requires signal acquisition (by the mobile device) of control signals from the LTU that include, for example, a primary synchronization signal (denoted as LTU-PSS), a secondary synchronization signal LTU-SSS (the UEs search for the primary and secondary synchronization signals, which are periodically sent by the various deployed nodes, to detect nodes and obtain information such as node identity, timing, and frequency offset of the detected nodes), LTU specific reference signal (LRS) that is used to demodulate downlink channels, and/or the LTU physical broadcast channel (LTU-PBCH) which provides the physical channel for the static part of the broadcast control channel. In addition, control signals may include an LTU Physical Downlink Shared Channel (LTU-PDSCH), which provides additional TBS system information, such as PRS configuration information (if this cannot be provided in the LTU-PBCH), neighbor cell (e.g., eNB) and/or neighbor LTU list, LTU coordinates, and/or LTU transmit time offset and drift (e.g., if not zero). LTU-PDSCH, in some embodiments, requires additional control signals such as LTU-PCFICH and/or LTU-PDCCH. In addition, and as will be discussed in greater detail below, signaling from the LTU includes one or more broadcast positioning reference signals (denoted LTU-PRS) that is used, for example, for TOA estimation. This full/standalone LTU allows TBS positioning in UE standalone positioning mode.

In the second scenario, corresponding to a partial standalone operation (in which system information, such as TBS system information, is provided in assistance data received from some other network node, or even from a different network, rather than from the LTU, and in which the LTU is configured to operate separately/independently from any network node supporting uplink communication functionality), the LTU signaling may include control signals (to, for example, facilitate signal acquisition by the UEs), including LTU-PSS, LTU-SSS, LRS, LTU-PBCH, and may also include positioning signaling, such as LTU-PRS transmissions, to facilitate, for example, TOA estimation. However, LTU-PDSCH as well as LTU-PCFICH and/or LTU-PDCCH signaling is not required in this mode. The TBS system information, which is contained in LTU-PDSCH signaling for the full standalone mode, may instead be provided via assistance data, from a location server or other network node. In the second scenario, the LTU's can still operate independent from E-UTRAN node (or any non-TBS network node supporting uplink communication), but another node, such as a serving eNB node, a location server (e.g., E-SMLC, which may be similar to the E-SMLC node 230 depicted in FIG. 2), etc., provides assistance data (including TBS system information, such as PRS configuration data, neighbor cell/LTU list, LTU coordinates, etc.) for LTUs. This partial standalone LTU enables TBS positioning in UE-based and UE-assisted positioning mode.

In the third scenario, in which a particular LTU is integrated in an operator's OTDOA deployment, LTU signaling includes positioning signals, such as LTU-PRS transmissions. In this operation mode, signal acquisition is generally performed via the UE serving cell, and assistance data is provided from, for example, a serving cell (e.g., a serving node, a location server, etc.). In this scenario, the LTU does not operate independent from E-UTRAN node (or any non-TBS network node supporting uplink communication), and thus is synchronized with E-UTRAN. For example, the DL frame transmission between a base station (eNB, or non-TBS network node) and LTUs are configured for in time synchronization. The eNB (or non-TBS network node) and LTU DL frames may be aligned on frame boundary only, or may be aligned on both, frame boundary and system frame number. If the eNB (or non-TBS node) and LTU DL transmission is aligned on frame boundary but not on frame number (SFN), the offset between E-UTRAN and LTU frame timing (e.g., SFN offset) may be provided in the assistance data. Generally, once a UE has acquired the base station signal (during normal UE operation), it has obtained the base station DL timing (e.g., system frame number). Because the LTU timing in this third scenario is based on the base station DL timing, the UE has then also the LTU timing and no LTU control signals are needed. Any timing offset (e.g., SFN offset) between base stations and LTUs (if not zero) would need to be provided in the assistance data or in other control signaling from a node different from the LTU. In this third scenario, TBS positioning is integrated in, or hybridized with, OTDOA positioning.

The LTU's described herein may implement one, some, or all of the above scenarios. For example, in some embodiments, an LTU may implement only the network integrated mode of operation (the third scenario), or implement the network integrated mode and the partial-standalone mode of operation (the second scenario). For either of those implementations, a wireless node different from the LTU would need to transmit at least some of the control and reference signals required, for example, for LTU detection or LTU timing determination. In some embodiments, the full-standalone mode of operation (corresponding to the first scenario) may also be implemented. If either of the full or partial standalone modes are implemented for a particular LTU, that LTU would need to be configured to transmit at least a subset of the control signals required for LTU detection by a mobile device. For example, in the partial standalone mode of operation, the particular LTU would be configured to transmit control signals (such as the synchronization signals described above), but not the system information signaling.

The required LTU signaling and channels discussed above may be based, in some embodiments, on existing LTE signaling. However, for LTU operation, some signaling modifications may be required to distinguish an LTU from an eNB so as to avoid a UE attempting network access/service (e.g., voice or data service) from an LTU, as discussed in further detail below.

One signaling modification, pertaining to signal-acquisition control signals (that are transmitted by an LTU when the LTU is configured to operate either in the first, full standalone, or the second, partial standalone, mode of operation), may be implemented for the LTU primary synchronization signal (LTU PSS) that may be transmitted by an LTU. Currently, in 3GPP LTE specifications (in particular, 3GPP Technical Specification (TS) 36.211 "Physical channels and modulation") there are three PSSs that are defined (frequency-domain Zadoff-Chu sequence), which are linked to the cell identity within the group $N^{(2)}_{ID}=\{0 \ . \ . \ 2\}$. To distinguish LTUs from eNBs (i.e., to avoid a situation in which a mobile device/UE finds an LTU during normal cell search), a $4^{th}$ PSS could be defined, exclusively for LTUs. A UE may be configured to search for the $4^{th}$ PSS when it is determined that the LTU signal should be acquired. The current root indices u in 3GPP TS 36.211, Table 6.11.1.1-1 for the Zadoff-Chu sequence are chosen to minimize complexity. The $3^{rd}$ PSS sequence, which is based on u=34 is the complex conjugate of the $2^{nd}$ sequence based on u=29. Therefore, two PSSs can be detected with a single/conjugate correlator. Although, a UE may not search eNBs and LTUs simultaneously, a $4^{th}$ PSS can be defined as a complex conjugate of the $1^{st}$ PSS sequence based on u=25. The sequence based on u=38 would be the complex conjugate of the sequence based on u=25, and existing correlators in the UE could be reused to detect the LTU-PSS. With this, a single LTU-PSS would provide 168 physical LTU-IDs. If additional LTU-IDs (i.e., more than 168) are needed in some embodiments, additional LTU-PSSs could be defined with additional root indices u.

Another type of control signal that may be used for LTU implementations operating in the first, full standalone, and the second, partial standalone, modes, is the LTU secondary synchronization signal (LTU-SSS). As described in 3GPP TS 36.211, each SSS sequence may be constructed by interleaving (in the frequency-domain) two length-31 BPSK modulated secondary sequence codes, SSC1 and SSC2. SSC1 and SSC2 are two different cyclic shifts of a single length-31 Maximum Length Sequence (M-sequence). The cyclic shift indices of the M-sequences are derived from a function of the physical layer cell identity group $N^{(1)}_{ID}=\{0 \ . \ . \ 167\}$. Because the concatenated sequence is scrambled by a code that depends on the PSS, a new SSS sequence is not needed for the LTU. With a single additional LTU-PSS, as discussed above, 168 physical LTU-IDs can be defined.

For eNBs, the physical-layer cell ID is given by: $N^{cell}_{ID}=3N^{(1)}_{ID}+N^{(2)}_{ID}$, as specified in 3GPP TS 36.211, section 6.11. As noted, $N^{(1)}_{ID}$ is in the range of 0 to 167 and represents the physical-layer cell-identity group, which is determined via SSS detection, while $N^{(2)}_{ID}$ is in the range of 0 to 2 and represents the physical-layer identity within the physical-layer cell-identity group, which is determined via PSS detection. With a single LTU-PSS as described above, one hundred and sixty eight (168) LTU-IDs are possible, i.e., $N^{LTU}_{ID}=N^{(1)}_{ID}$. Because the SSS is scrambled with the LTU-PSS, no changes to SSS would be needed for the LTU-SSS. Because the LTU-ID determines the seed for the scrambling sequence, for, e.g., LTU-PBCH, etc., the LTU-IDs may have an offset of 504 in some embodiments (which is the eNB physical-layer cell identity range). This would avoid any conflicts with eNB network planning (e.g., scrambling sequences used by eNBs). The physical layer LTU-ID can, therefore, be determined according to $N^{LTU}_{ID}=N^{(1)}_{ID}+504$ in some embodiments. Thus, in some embodiments, while configured to operate in the first, full standalone, mode, or the second, partial standalone, mode, the LTU may be configured to transmit LTU broadcast control signals, including to transmit an LTU primary synchronization signal and an LTU secondary synchronization signal, with the LTU SSS derived at least in part based on the LTU PSS and an identification value assigned to the LTU, and with the LTU PSS and LTU SSS (which are detectable by at least one mobile wireless device (UE)) configured to support determination of LTU frame timing, and with the LTU SSS being used to determine the physical layer identifier for the LTU. Thus, with the above LTU-PSS and LTU-SSS, an LTU can be distinguished from an eNB, thus allowing a UE to avoid attempting network services (e.g., voice or data service) from an LTU.

To implement LTU-IDs≥ 504 (i.e., greater than the possible value range for LTE eNB's (which is 0 to 503, as mentioned above), some further signalling modification may be required, pertaining to the scrambling sequence or pseudo-random sequence generation. The scrambling sequence may be used for scrambling the LTU-PBCH as mentioned above, as well as for generating the LRS or LTU-PRS sequences, as described further down below. The pseudo-random sequence may be generated with a length-31 Gold sequence generator, as specified in section 7.2 of 3GPP TS 36.211. For PRS, for example, the pseudo-random sequence generator may be initialized with:

$$c_{init}=2^{10} \cdot (7 \cdot (n_s+1)+l+1) \cdot (2 \cdot N_{ID}^{cell}+1)+2 \cdot N_{ID}^{cell} N_{CP}$$

at the start of each OFDM symbol, where $N_{CP}=1$ for normal cyclic prefix (CP), and $N_{CP}=0$ for extended cyclic prefix, with $n_s$ being the slot number within a radio frame ($n_s=0$ . . 19), and with l being the OFDM symbol number within the slot (l=0 . . 6 for normal CP, and l=0 . . 5 for extended CP). Therefore, the final pseudo-random sequence is determined by the initial seed $c_{init}$, with this initial seed being determined by the slot number within a frame $n_s$, OFDM symbol number within a slot l, and the cell identity.

Figure 3A:
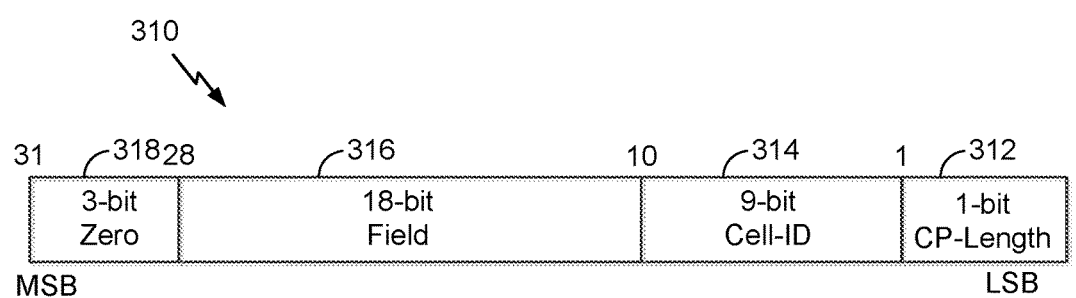
FIG. 3A is a diagram of an initialization seed for a pseudo-random number generator.

The formula for $c_{init}$, as described above, allows for length 9-bit cell identifiers, which can cover the range from 0 to 511. Therefore, it allows for cell identities in the range from 0 to 503, as currently defined for eNBs. FIG. 3A illustrates the initialization seed, $c_{init}$, 310 for a pseudo-random number generator, which includes four (4) parts:

1. A 1-bit CP length indication, $N_{CP}$, 312 (starting at LSB position of $2^0$);
2. A 9-bit cell-ID, $N_{ID}^{Cell}$, 314 (starting at LSB position of $2^1$);
3. An 18-bit field 316, containing a value computed according to $(7 \cdot (n_s+1)+l+1) \cdot (2 \cdot N_{ID}^{cell}+1)$ (starting at LSB position of $2^{10}$; and
4. A 3-spare bits field 318 with a value of zero (starting at LSB position of $2^{28}$).

The cell-ID, $N_{ID}^{cell}$, is part of the 9-bit field 314 and the 18-bit field 316. Increasing the cell-ID to values greater than 511 would affect both, the 9-bit cell-ID field 314 and the 18-bit field 316. However, for creating orthogonal PRS sequences, the 18-bit field 316 does not need to be increased when the cell-ID is increased to values greater than 511 (i.e., greater than 9-bits). The currently 3-spare bits of the field 318 can be used to increase the cell-ID from, currently, 9-bits to 12-bits. This would result in a 12-bit cell-ID (range 0-4095), which could be used for the LTU-IDs greater than 504.

Figure 3B:
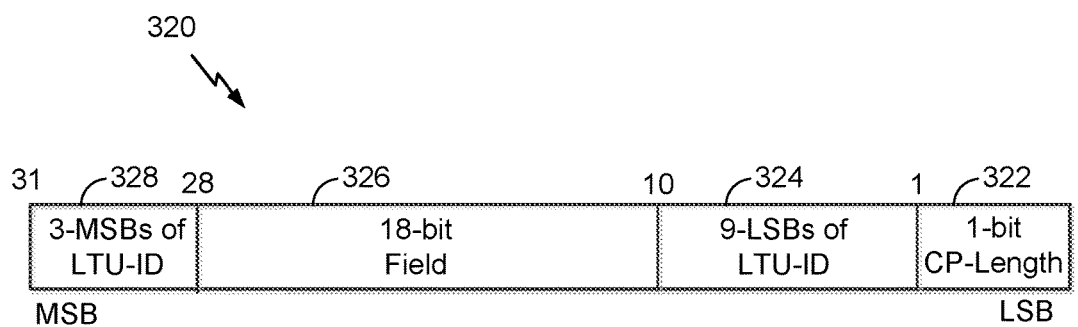
FIG. 3B is a diagram of a modified initialization seed for a pseudo-random number generator.

For backwards compatibility, the structure of $c_{init}$ 310, as depicted in FIG. 3A, can often not be changed (e.g., the simplest solution may be to shift the 18-bit field 316 three (3) bits to the left). Therefore, the 12-bit LTU-ID may need to be split into 9-bit Least Significant Bits (LSBs) and 3-bit Most Significant Bits (MSBs), with the 3-bit MSBs being used to fill the currently 3-spare bits of the field 318, as illustrated in FIG. 3B. More particularly, FIG. 3B illustrates the modified initialization seed $c'_{init}$ 320, according to some embodiments, which also includes four (4) parts/fields:

1. A 1-bit CP length indication, $N_{CP}$, 322 (starting at LSB position $2^0$);
2. A 9-bit LSBs of LTU-ID 324 ($N_{ID}^{LTU}$ mod 512; starting at LSB position $2^1$);
3. An 18-bit field 326 (starting at LSB position $2^{10}$, containing a value computed according to: $(7 \cdot (n_s+1)+l+1) \cdot (2 \cdot (N_{ID}^{LTU} \bmod 512)+1)$; and
4. A 3-bit field 328, with the MSBs of $$LTU\text{-}ID\left(\left\lfloor \frac{N_{ID}^{LTU}}{512} \right\rfloor\right);$$

starting at LSB position $2^{28}$).
where $\lfloor x \rfloor$ is the largest integer less than or equal to x (i.e., floor operation, which rounds x to the nearest integers towards minus infinity), and mod x denotes the modulo operation.

The pseudo-random sequence generator for LTU signals may then be initialized with:

$$c'_{init} = 2^{28} \cdot \left\lfloor \frac{N_{ID}^{LTU}}{512} \right\rfloor + 2^{10} \cdot (7 \cdot (n_s+1)+l+1) \cdot (2 \cdot (N_{ID}^{LTU} \bmod 512)+1) + 2 \cdot (N_{ID}^{LTU} \bmod 512) + N_{CP}$$

where $N_{ID}^{LTU}$ denotes the LTU-ID. The modified initialization seed $c'_{init}$ 320 is backwards compatible with the initialization seed $c'_{init}$ 310. That is, for cell-IDs (LTU-IDs) 0 to 504, $c'_{init}$ results in the same values as $c_{init}$. However, with this modification of the initialization seed $c'_{init}$ 320, cell-IDs (LTU-IDs) greater than 503 are possible (up to 4095). Therefore, each LTU can now have a different LTU-ID assigned, which can be different from the identity (e.g., cell-id) of other non-LTU nodes.

To demodulate different downlink physical channels coherently, a mobile device (UE) requires complex valued channel estimates for each subcarrier. Known cell-specific reference symbols are inserted into the resource grid. The cell-specific reference signal is mapped to Resource Elements (REs) spread evenly in the resource grid, in an identical pattern in every Resource Block (RB). A UE usually assumes that cell-specific reference signals are transmitted. The cell specific reference signals (CRS) as specified in 3GPP TS 36.211 can also be used for the LTUs. The sequence generation and mapping to resource elements depends on the physical layer ID. With the physical layer LTU-ID, as described herein, any conflicts with existing eNB deployments can be avoided and LTUs are distinguished from eNBs (i.e., LTU-IDs>503). The LRS sequence may be generated with a pseudo-random number generator initialized with, for example, the scrambling seed $c'_{init}$ 320, as described above. Thus, in some embodiments, the LTU may be configured, while operating in one of the first, full standalone, mode, or the second, partial standalone, mode, to transmit LTU broadcast control signals, including to derive, by the LTU, based at least in part on a physical layer identifier for the LTU, an LTU specific reference signal (LRS) including data for demodulating (e.g., at the mobile device (UE)), signals from the LTU, and to transmit, by the LTU, the LTU LRS.

Signal-acquisition signaling may also include configuring the LTU physical broadcast channel (LTU-PBCH) signaling. The PBCH provides the physical channel for the static part of the Broadcast Control Channel (BCH). For eNBs, the PBCH contains the 24-bit Master Information Block (MIB) according to the following configuration: 3 bits for system bandwidth, 3 bits for Physical Hybrid-ARQ Indicator Channel (PHICH) information, 8 bits for system frame number, and 10 bits reserved for future use. Apart from the information in the payload, the MIB cyclic redundancy check (CRC) may also convey the number of transmit antennas used by the eNB. The MIB CRC may be scrambled with an antenna specific mask. For LTUs, the system frame number (SFN) is generally needed (e.g., because the PRS configuration is determined based on the SFN, as described herein), and, in some situations, also the system bandwidth. The complete PRS configuration information may be provided in the MIB, which would avoid the need for LTU-PDSCH (in some embodiments). However, it is to be noted that 24-bits are generally not enough to provide the PRS configuration information for each LTU.

The PRS configuration information for each LTU, together with other TBS system information (e.g., LTU coordinates), that are used for position-determination purposes (but which may also be used to facilitate signal-acquisition), may be included with the LTU Physical Downlink Shared Channel (LTU-PDSCH). As noted, the LTU-PDSCH generally may only be present when that LTU operates in full standalone mode (in other modes of operation for an LTU node, TBS system information may be communicated to a UE via assistance data transmission from a non-LTU node). Generally, the PDSCH provides the dynamic (quasi-static) part of the Broadcast Control Channel (System Information Blocks (SIBs)). Although, SIBs may be transmitted on a fixed schedule, the resource allocation of the PDSCH carrying SIB may be dynamic. The SIB periodicity is, in some embodiments, 80 ms, with repetitions made within the 80 ms. Redundant copies may periodically be transmitted (e.g., every 20 ms). The resource allocation of the PDSCH carrying SIB is indicated in an associated Downlink Control Information (DCI) message carried on the PDCCH. The base station generally encrypts all DCI messages with a Radio Network Identifier (RNTI) that characterizes the intended recipient. SIB, which are of interest to all users, have a known RNTI of 65535 (called SI-RNTI or System Information RNTI). This allows all UEs to look for and decode SIB. The PDCCH carries a variable number of DCI messages of variable lengths that can start at various locations within the PDCCH space.

For LTU operation, one DCI intended for all LTU users may be needed, which could be scrambled with a LTU-RNTI. However, because a UE would not need to search for multiple LTU-DCIs, the LTU-DCI could be fixed/predefined, as discussed herein. Only descriptions about downlink data transmitted to the UEs would need to be defined, e.g., resource block assignment, and/or Modulation and Coding Scheme (MCS). This would avoid the need for LTU control channels (LTU-PCFICH, LTU-PDCCH). The LTU-SIB may, in some implementations, include the following information required to carry out RSTD measurements and position calculation: PRS configuration (if this cannot be provided in the LTU-PBCH), neighbor cell/LTU list, LTU coordinates, and/or LTU transmit time offset and drift (if not zero).

As noted, LTUs are configured to transmit broadcast positioning reference signals (PRS) to facilitate determination of location information (e.g., location determination for a mobile device/UE receiving the LTU PRS transmissions). The positioning reference-signal sequence $r_{l,n_s}(m)$ may be defined by:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ is the slot number within a radio frame, l is the OFDM symbol number within the slot. The pseudo-random sequence c(i) may be generated using the pseudo-random sequence generator defined in 3GPP TS 36.211 clause 7.2. The pseudo-random sequence generator may be initialized with:

$$c'_{init} = 2^{28} \cdot \left\lfloor \frac{N_{ID}^{PRS}}{512} \right\rfloor + 2^{10} \cdot (7 \cdot (n_s + 1) + l + 1) \cdot (2 \cdot (N_{ID}^{PRS} \bmod 512) + 1) +$$
$$2 \cdot (N_{ID}^{PRS} \bmod 512) + N_{CP}$$

at the start of each OFDM symbol, where $$N_{CP} = \begin{Bmatrix} 1 & \text{for normal } CP \\ 0 & \text{for extended } CP \end{Bmatrix}$$

The quantity $N_{ID}^{PRS}$ is generally denoted as PRS-ID and may equal $N_{ID}^{LTU}$ in some embodiments. The cell-specific frequency shift may be given by $v_{shift}=N_{ID}^{PRS} \bmod 6$.

If a TBS operates on a standalone TBS carrier frequency, all sub-frames could be dedicated to PRS transmissions (in sub-frames when/where e.g., no control signals are present). This would allow longer (likely coherent) integration, shorter response times, and more UE flexibility in scheduling measurements. It would also provide more flexibility for the eNB to allocate measurement gaps (if needed), for example for inter-frequency measurements. Gapless measurements may be preferred, because a gap could be approximately 6 ms (which, effectively, may correspond to approximately four (4) useful PRS subframes). Standalone TBS carrier may also be shared with other broadcast services (e.g., Multimedia Broadcast Multicast Service (MBMS)). Because PRS transmission in all sub-frames would mean a single PRS occasion, some clarification for the muting bit-string would be required (i.e., each bit in the muting bit-string would indicate which occasion is on/off). The $T_{PRS}$ and/or $N_{PRS}$ would need to be adjusted to allow several "positioning occasions" also in case of a standalone TBS carrier with all sub-frames transmitting PRS. For example, if a positioning occasion of $N_{PRS}=6$ should be configured, the periodicity should be $T_{PRS}=6$ ms for a dedicated TBS carrier.

The PRS subframe configuration may be, in some embodiments, determined by three parameters:

a) Number of consecutive DL subframes with PRS configured, $N_{PRS}$ (termed "Positioning Occasion");
b) PRS configuration index $I_{PRS}$; and
c) Number of positioning occasions per muting pattern repetition $T_{REP}$.

The PRS configuration index $I_{PRS}$, in turn, determines the PRS periodicity $T_{PRS}$ and the PRS subframe offset $\Delta_{PRS}$. The PRS instances, for the first subframe of the downlink subframes, satisfy $(10 \times n_f + \lfloor n_s/2 \rfloor - \Delta_{PRS}) \mod T_{PRS} = 0$, as described herein. The number of consecutive DL subframes, $N_{PRS}$, is defined in 3GPP LPP protocol and currently can take the following values: 1, 2, 4, 6 subframes (or milliseconds (ms)). The PRS configuration index $I_{PRS}$ is defined in 3GPP TS 36.211 as follows:

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | Reserved | |

A higher duty rate PRS (up the special case of PRS in all DL subframes) may be realized by (a) increasing $N_{PRS}$, and/or (b) reducing $T_{PRS}$.

Increasing $N_{PRS}$ would allow better compatibility with legacy UEs since LTUs can use e.g., a 160 ms periodicity with extra subframes above $N_{PRS}$=6 not being measured by legacy UEs. An increased $N_{PRS}$ would allow longer integration times per positioning occasion, where the integration could be coherent and/or non-coherent. Since muting is defined per positioning occasion, the integration for a given increased $N_{PRS}$ would be performed essentially under the same Signal-to-Interference and Noise-Ratio (SINR) condition. With proper muting pattern planning, longer integration times per positioning occasion could then increase hearability (the noise source may then be primarily thermal noise).

A higher duty rate PRS can also be realized by reducing $T_{PRS}$ to smaller values than currently defined. A reduced $T_{PRS}$ would be advantageous in (e.g., shared) TBS deployments where the number of $N_{PRS}$ cannot easily be increased, or for TDD UL/DL configurations where the number of DL subframes in a radio frame is relatively small (e.g., when Enhanced Interference Mitigation and Traffic Adaptation (eIMTA) is enabled on a carrier shared with TBS, there may be generally a smaller number of DL subframes available for PRS). A reduced $T_{PRS}$ would still allow to provide PRS assistance data for legacy UEs, if a multiple of the new (reduced) $T_{PRS}$ can describe any of the legacy PRS periodicities (e.g., 160 ms). However, muting pattern planning may be more difficult in some cases, since the legacy muting pattern with e.g., 160 ms periodicity must be a subset of actual muting pattern used with the reduced $T_{PRS}$.

A full-duty cycle PRS (i.e., PRS in all DL subframes) could then be realized by setting $N_{PRS}$ equal to the PRS periodicity $T_{PRS}$. This would maintain the definition of a "positioning occasion" also in case of PRS in all DL subframes, which would be required to support muting as currently defined.

In some embodiments, when defining PRS subframe configurations with PRS in up to all subframes within a radio frame and in up to all radio frames of a downlink carrier, the notion of "Positioning Occasion" is maintained in order to support muting as currently defined. Therefore, in order to support a higher duty rate PRS (up to the special case of a full-duty cycle PRS), the maximum length of a positioning occasion may be increased to 160 subframes. In some embodiments, the number of consecutive downlink subframes $N_{PRS}$ with positioning reference signals can be defined as an integer between 1 and 160 subframes. The PRS periodicity $T_{PRS}$ can be reduced down to 5 ms (or 5 subframes), for example. In some embodiments, the PRS configuration index can be defined as follows:

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

The above allows more flexibility in configuring PRS subframes. Any desired PRS subframe configuration could be realized, including for example infrequent long occasions (e.g., for longer integration times and better hearability; up to 160 subframes per occasion), as well as frequent short occasions (e.g., 1 subframe every 5 ms). For configuring a full duty cycle PRS (where $N_{PRS}=T_{PRS}$), there would then also be multiple options. For example, it is possible to configure very frequent muting occasions (with small $N_{PRS}$ and $T_{PRS}$) for interference averaging, or infrequent muting occasions (with large $N_{PRS}$ and $T_{PRS}$) for longer integration times.

The PRS muting configuration is defined by a periodic PRS muting sequence with periodicity $T_{REP}$, where $T_{REP}$ is counted in the number of PRS positioning occasions (currently, 2, 4, 8, or 16 which is the length of the muting bit string that represents the PRS muting sequence is possible). With the above described additional measurement occasions per SFN cycle, longer muting pattern bit strings ($T_{REP}$) would be possible. A longer muting pattern would allow to orthogonalize more neighbor cells and/or Transmission Points (TPs) in time. For example, with 4096 LTU-IDs as described herein and a frequency shift reuse of 6, each frequency group would have in total 683 colliding members. A muting pattern≥683 could produce fully orthogonal measurements for all LTU-IDs. With the short PRS periodicities $T_{PRS}$, longer muting pattern are possible to implement (within the e.g., 10.24 seconds SFN-cycle length).

Longer muting pattern are also desired for better supporting legacy UEs. If a UE does not support the additional PRS configurations described herein (e.g., a legacy UE, or a UE without "PRS-based TBS capability"), assistance data for a TP which has one of the additional PRS configuration options configured can still be provided to this UE, since the legacy configuration options are a special case of the additional options. However, the e.g., legacy UE would then (of course) not "see" the additional PRS subframes. For example:

A TP has PRS configured every 20 ms with $N_{PRS}$=5 subframes, and $\Delta_{PRS}$=2 subframes. Therefore, $I_{PRS}$=2417 according to the Table above, and $N_{PRS}$=5. If the target UE does not support the additional PRS configurations described herein, the location server could provide a corresponding legacy PRS configuration in the assistance data to this UE. For example, $I_{PRS}$=2, and $N_{PRS}$=4. Therefore, the legacy UE would "see" every $8^{th}$ occasion, and could use the 4 subframes (of actual 5 subframes) of each occasion. For providing the muting pattern for this legacy UE, the ON/OFF bit and $T_{REP}$ of the provided legacy muting pattern must correspond to actual ON/OFF bit used for the actual configured higher duty rate PRS muting pattern. If the higher duty rate PRS TP would use a 16-bit muting pattern, $T_{REP}$ would be 16×20 ms=320 ms in the example above. The corresponding muting pattern for the legacy UE (which would see a PRS periodicity of 160 ms) would then only be 2-bits long (i.e., bit 1 and 8 of the 16-bit $T_{REP}$), which may affect the performance of the legacy UE. If the actual TP with $I_{PRS}$=2417 would use a 128-bit muting pattern instead (i.e., $T_{REP}$=128×20 ms=2.56 seconds), the equivalent muting pattern for the legacy UE could be 16-bits: 16×160 ms=2.56 seconds (i.e., every 8th bit of the actual 128-bit pattern).

Therefore, in some embodiments additional PRS muting bit string lengths ($T_{REP}$) of 32, 64, 128, 256, 512, and 1024 may be used.

Alternatively, random muting could be defined which is initialized with an LTU specific seed (e.g., LTU-ID). This would also avoid the need for the muting bit-string in the PRS configuration information, and the PRS information may fit into the LTU-MIB. If TBS is deployed on a shared carrier (e.g., shared with LTE data services), the LTU PRS configuration should be the same as for the LTE cells/eNBs (e.g., on the same carrier) to avoid LTU-eNB and eNB-LTU interference (e.g., interference exists only in PRS subframes). Additional PRS configurations ($N_{PRS}$>6 and $T_{PRS}$<160 ms) could be defined as described herein, which could be applicable to both eNBs and LTUs. The PRS Information Element currently includes 33-bits, which needs to be provided for each LTU as follows: 3 bits for the PRS Bandwidth, 12 bits for the PRS Configuration Index, 2 bits for the $N_{PRS}$, and 16 bits for the Muting Bit String. Usually, the PRS Bandwidth, PRS Configuration Index, and $N_{PRS}$ is the same for all neighbor cells/LTUs, but the Muting Bit String would be cell/LTU dependent (e.g., would need to be provided in a neighbor LTU list). Therefore, the PRS Information Element may not fit into the LTU-MIB. One possibility could be to define a set of pre-defined PRS configurations, and include only an index in the LTU-MIB. Without the Muting Bit String, the PRS Info would be 17-bits long and would fit into the LTU-MIB. The Muting Bit String could be avoided by defining a random ON/OFF state for each sub-frame/occasion. The LTE pseudo-random sequence (scrambling) generator, initialized with the LTU-ID at the beginning of each SFN cycle could be reused for this purpose. However, because information other than PRS configuration information may be needed at the UE (e.g., LTU coordinates, neighbor list), an LTU-PDSCH carrying LTU-SIB would generally be required.

Figure 4A:
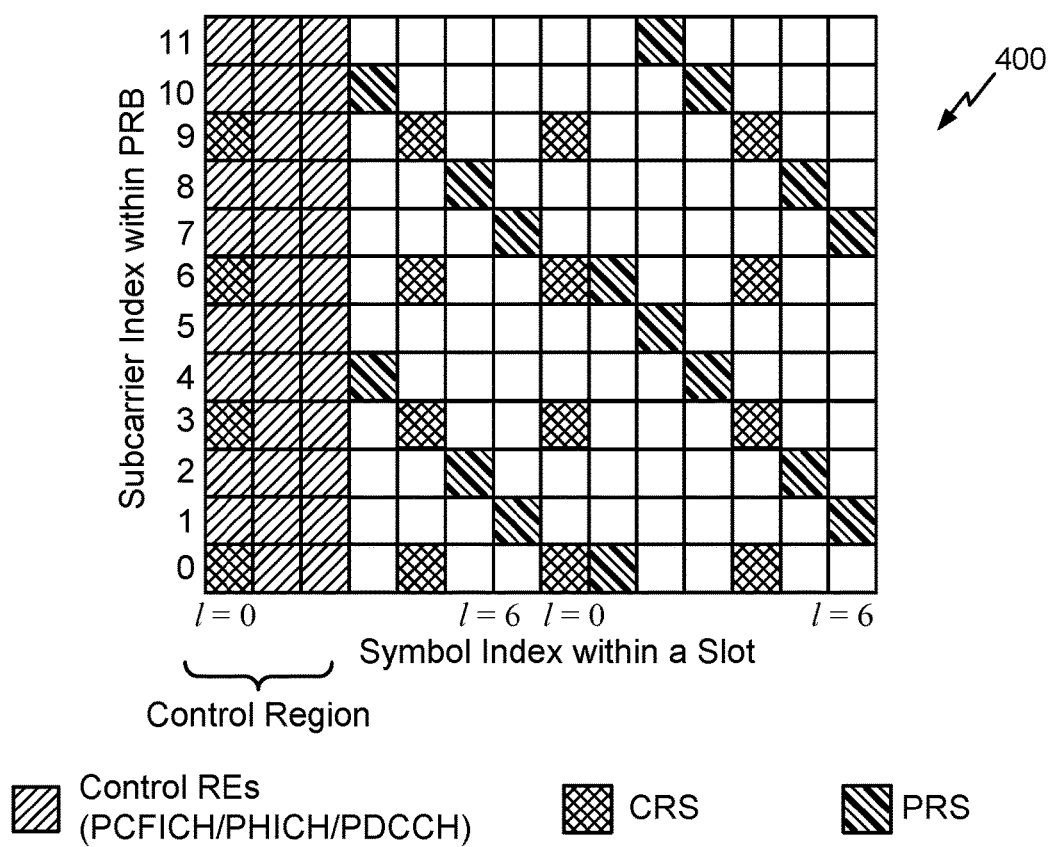
FIG. 4A is a diagram of a PRS scheduling pattern.

With reference to FIG. 4A, a diagram of a PRS scheduling pattern 400 is provided. As shown, in the PRS scheduling pattern 400, PRS REs are scheduled in non-control and non-CRS (cell specific reference signals) symbols in a sub-frame. For an LTU's first mode of operation (e.g., the scenario of full-standalone operation), generally a similar PRS scheduling pattern as the one depicted in FIG. 4A (e.g., scheduled by the LTU for transmissions from the LTU) would be required for scheduling LTU positioning reference signals, i.e., a control region and CRS (LRS) in the subframe would be needed. The control region could be avoided in case of a predefined/fixed DCI for the LTUs. For the second LTU mode of operation (e.g., the second scenario, involving partial standalone operation, with assistance data received from, for example, the serving network), LTU-PDSCH is not used by an LTU configured for that mode of operation, and therefore, some of the control signals or symbols are not needed (e.g., no LTU-PDSCH, and therefore, no LTU-PCFICH/LTU-PDCCH). In that case, symbols 1 and 2 (e.g., of the sub-frame pattern 400 in FIG. 4A) may instead be used for LTU-PRS transmissions.

For the third LTU mode of operations, e.g., where the LTU is integrated in OTDOA deployment, control symbols and CRS are not needed (i.e., the LTU does not transmit control signals such as signal-acquisition signaling or TBS system information). In that case, all symbols of the subframe may be used for LTU-PRS transmissions. Using the control- and CRS REs for LTU-PRS would provide more symbols for coherent integration within a sub-frame, and would avoid tones without PRS. The resulting pattern would still be compatible with the legacy pattern. An example PRS scheduling pattern 410 (also referred to as an "extended PRS pattern"), in which all subcarriers for all symbols with a sub-frame are available for PRS scheduling, is shown. FIG. 5 includes a graph 500 that shows simulation results for the extended PRS scheduling pattern 410 of FIG. 4B (in which all symbols of the sub-frame contain at least one LTU-PRS transmission). As can be seen from the graph 500 of FIG. 5, use of the extended PRS pattern can provide an improvement in performance.

For the third LTU mode of operations, e.g., where the LTU is integrated in an OTDOA deployment, the LTUs may transmit PRS signals only as described herein. Since the PRS-only TBS LTUs or TPs do not transmit a LTU-PSS/LTU-SSS/LRS/LTU-PBCH, there is no way for a UE to determine frame/slot timing and SFN from a PRS-only TBS TP (LTU). Since the occurrence of PRS occasions depends on the system frame number as described herein, some "Virtual-SFN" which counts the radio frames modulo 1024 may need to be assumed when configuring the PRS occasions on a PRS-only TP. The PRS-only TBS TP (LTU) must be synchronized with other OTDOA cells/TPs, as described herein.

The OTDOA assistance data information enable the UE to perform neighbour cell/TP RSTD measurements. The information about e.g., expected RSTD, search window and PRS subframe offset allow the UE to generate an appropriate replica PRS and estimate the RSTD. The expected RSTD etc. is defined relative to the timing of the assistance data reference cell. If the assistance data reference cell is different from the UE serving cell, the timing is usually not known to the UE, and the UE is required to decode PBCH and acquire SFN of the assistance data reference cell. However, this is not possible for a PRS-only TP (LTU) for the third LTU mode of operations.

Furthermore, the muting configuration for all cells in the OTDOA assistance data is defined with respect to SFN=0 of the assistance data reference cell. If the assistance data reference cell is not the UE serving cell, the UE would be required to obtain the SFN of a non-serving cell (usually by decoding PBCH), which is however, not possible for a PRS-only TP (LTU) for the third LTU mode of operations.

Furthermore, the location report (e.g., LPP OTDOA Signal Measurement Information) includes a time stamp in form of the system frame number of the RSTD reference cell during which the most recent neighbour cell measurement was performed by the UE. A system frame number cannot be obtained from a PRS-only TP (LTU) for the third LTU mode of operations.

Therefore, for the third LTU mode of operations, the LTU or PRS-only TP cannot be used as assistance data and RSTD reference cell. Therefore, the OTDOA assistance data indicates in some embodiments that the particular assistance is provided for a PRS-only LTU or TP. This could be implemented by including a flag (or any other appropriate indicator) in the OTDOA assistance data, or by assigning a predefined value range for the LTU-ID of a PRS-only LTU/TP.

Figure 4B:
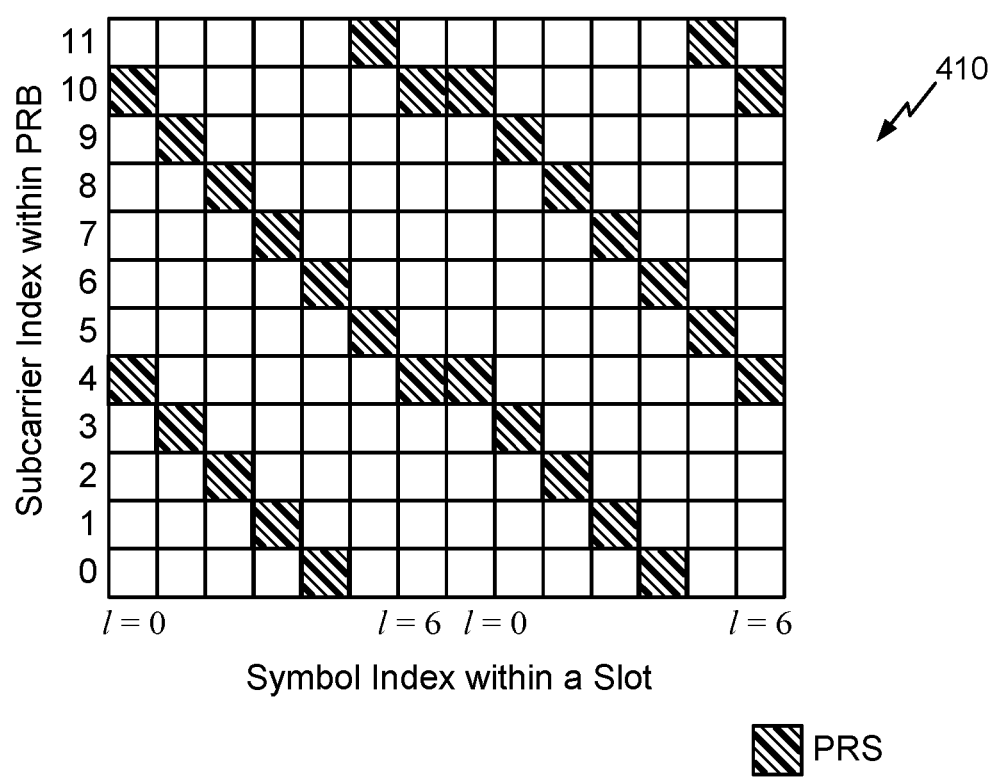
FIG. 4B is a diagram of an extended PRS scheduling pattern.
Figure 5:
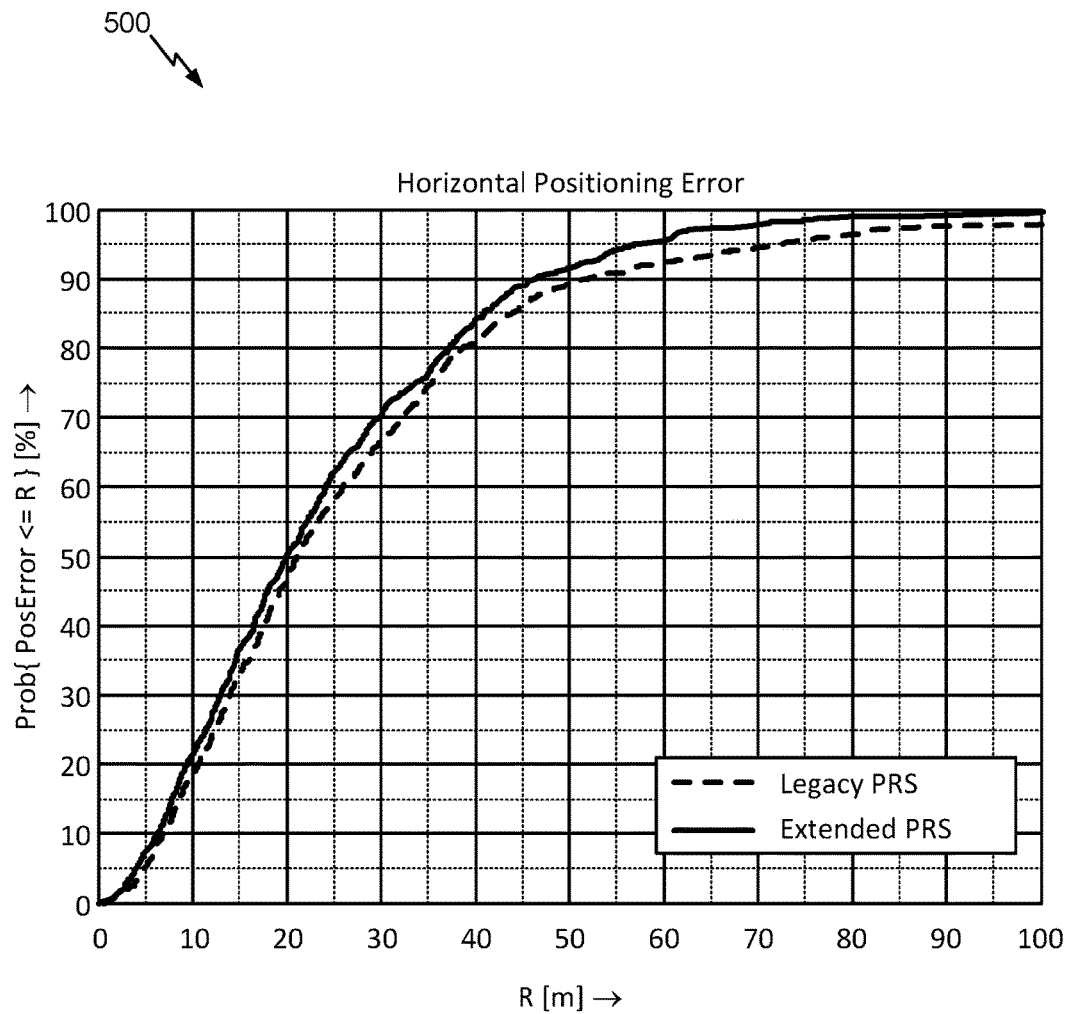
FIG. 5 is a graph showing simulation results for the extended PRS scheduling pattern of FIG. 4B.

In some embodiments, for the third LTU mode of operations, the LTU may transmit either the legacy PRS pattern according the FIG. 4A or the extended PRS pattern according to FIG. 4B. However, since for the third LTU mode of operations, no LTU control signalling is present, a UE would not know which PRS pattern is used by a particular LTU. Therefore, in some embodiments, the OTDA assistance data may include an additional indicator which indicates the type of PRS pattern used by the PRS-only TBS TP (e.g., "normal" or "extended" pattern).

In some embodiments, PRS implementation in LTU's may also include a random $v_{shift}$. In some implementations, PRS is implemented as a 6-tone stride pattern in every OFDM symbol of a PRS sub-frame, as shown in FIG. 4A and FIG. 4B. In frequency, every $6^{th}$ tone in an OFDM symbol of a PRS sub-frame contains a PRS RE, forming a diagonal pattern of PRS REs in a sub-frame. There are 6 possible diagonal PRS pattern, which is determined by a frequency shift $v_{shift}$=mod(LTU-ID,6), where LTU-ID is the physical layer LTU identity, which may be equal to the PRS identity (PRS-ID) in some embodiments. Because the frequency offset is determined by LTU-ID, the PRS pattern is a by-product of network planning. The pattern is the same in each sub-frame. This means that two cells with the same mod(LTU-ID,6), for example LTU-ID's 0 and 6, will collide in the frequency domain (occupy the same diagonal pattern) and create interference to each other. To avoid static interference, the $v_{shift}$ could be a random number between 0 and 5 at every positioning occasion/sub-frame. That is, the frequency shift $v_{shift}$ will no longer be based on mod(LTU-ID,6) but based on a random number generator distributed in the range of 0-5, that can hop to a new value in every PRS sub-frame. An LTU-specific pseudo-random hopping pattern would randomize the inter-cell interference for LTU-PRS. This could be implemented with the LTE scrambling code generator, which could be used as random number generator, initialized at the beginning of each SFN-cycle with an LTU-ID specific seed. If a PRS is blocked from detection due to PRS collision in the frequency domain in one sub-frame, it is unlikely that it will be blocked again in the next sub-frame or the one after it. In some embodiments, use of a random $v_{shift}$, no LTU-ID planning, and no muting, can produce similar results as with LTU-ID planning and with muting. This could significantly simplify the LTU deployment, because no LTU network planning would be required. The random $v_{shift}$ could be implemented as backwards compatible (if needed), e.g., legacy PRS occasions can have a legacy $v_{shift}$ mod(LTU-ID,6) (with the legacy PCI range), and occasions in between could have a random $v_{shift}$ (with seed based on the LTU-ID).

In some embodiments, PRS implementation in LTU's may also include random muting. Muting is currently defined using a bit-string to indicate which occasion is on/off. Currently, the length of this bit-string is 2, 4, 6, 8, or 16 bits. Instead of defining muting via a bit-string, muting could be defined based on a random ON/OFF state. An LTE pseudo-random sequence generator, initialized, for example, with an LTU-ID at the beginning of each SFN cycle, could be reused. This would avoid signaling the muting bit-string, and the PRS configuration information may fit into the LTU-MIB. This may also be simpler in case of a dedicated TBS carrier, where all sub-frames contain PRS (i.e., a single "PRS occasion"). A random $v_{shift}$/muting may also control access to LTU-signals, e.g., difficult to crowd-source, and the random generator seed may be provided in the assistance data. In some embodiments, PRS implementations in LTU's may be performed through transmit (Tx) diversity (e.g., use of multiple antenna ports to transmit PRS transmissions). In some embodiments, PRS transmissions are transmitted from a single antenna port. Transmitting PRS from multiple antennas could improve RSTD estimation performance. Transmit diversity (e.g., simple antenna switching) may thus be supported, in some embodiments, for LTU-PRS.

Figure 6:
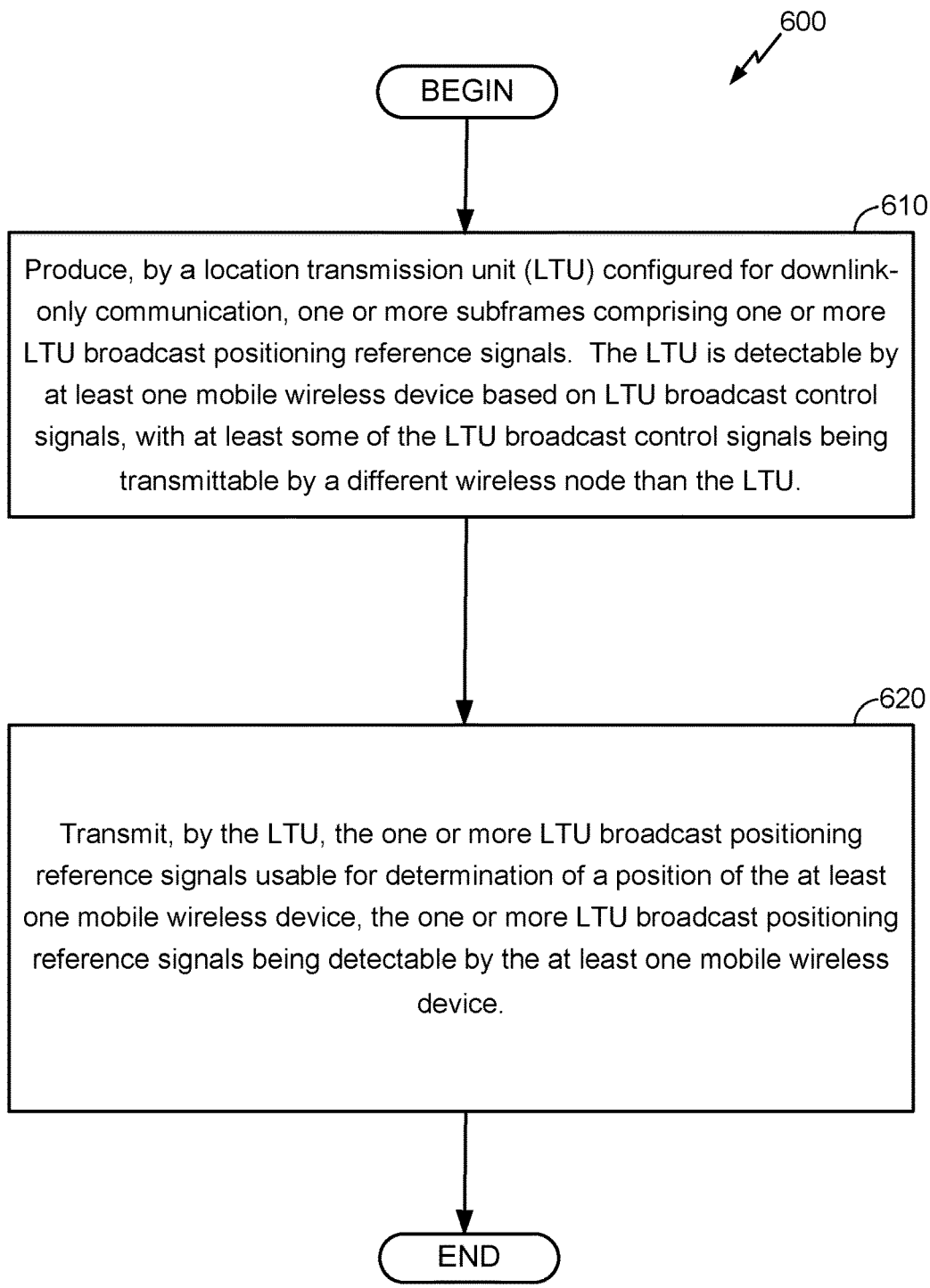
FIG. 6 is a flowchart of an example procedure, generally performed at a network node (e.g., LTU), to facilitate position determination operations.

With reference now to FIG. 6, a flowchart of an example procedure 600, generally performed at a network node configured to broadcast, downlink-only, transmissions (e.g., a location transmission unit node, such as the nodes 120a-b depicted in FIG. 1 and/or the LTU 220 depicted in FIG. 2), to facilitate position determination operations, is shown. The procedure 600 includes producing 610, by a location transmission unit (LTU) configured for downlink-only communication, one or more subframes comprising one or more LTU broadcast positioning reference signals. The LTU is detectable by at least one mobile wireless device based on LTU broadcast control signals, with at least some of the LTU broadcast control signals being transmittable by a different wireless node than the LTU.

As described herein, whether or not an LTU node produces and transmits downlink control signals may depend on the mode of operation that the LTU node is configured to operate in (the LTU may be configured to operate in multiple modes of operations, that include full standalone mode, partial standalone mode, and/or integrated network mode). For example, when the LTU node (such as the LTU's 120a-b of FIG. 1, or the LTU 220 of FIG. 2) is configured to operate in the integrated network mode, where it is synchronized to operate within a network comprising at least one network node supporting uplink communication (e.g., a non-LTU node such as the eNB node 210 of FIG. 2), the LTU may not be required to transmit control signals (such as signal-acquisition signaling), and thus all symbols and all sub-carriers in a particular sub-frames may be available to schedule PRS transmissions. On the other hand, if the LTU is configured to operate in the full standalone mode (e.g., independently of any network node supporting uplink communication) or in the partial standalone mode (in which one or more remote nodes, different from the LTU, transmit TBS system information with data relating to the LTU while the LTU is configured to operate separately/independently from any network node supporting uplink communication), at least some signal acquisition control signaling may be required to be transmitted by the LTU. In those situations, receiving mobile devices/UE's (that are to use PRS transmission to facilitate determination of location information) may detect the LTU at least in part based on at least some signal-acquisition signaling transmitted from the LTU.

In implementations in which at least some of the LTU control signals are transmittable by a different wireless node than the LTU (e.g., implementation in which the LTU is configured to operate in either the partial-standalone mode or the integrated network mode), the procedure 600 may further include transmitting, by the LTU, while the LTU is operating in the partial standalone mode, at least a subset of the LTU broadcast control signals. It will be noted that while the LTU is operating in the full standalone mode, the LTU is also configured to transmit LTU broadcast signals. In some embodiments, transmitting the subset of the LTU broadcast control signals (while operating in the partial standalone mode) may include transmitting an LTU primary synchronization signal (PSS) and an LTU secondary synchronization signal (SSS), with the LTU SSS derived at least in part based on the LTU PSS and an identification value assigned to the LTU, the LTU PSS and the LTU SSS being detectable by the at least one mobile wireless device and configured to support determination of LTU frame timing, and the LTU SSS being usable to determine a physical layer identifier for the LTU. In some embodiments, transmitting, by the LTU, the subset of the LTU broadcast control signals while operating in the partial standalone mode may include deriving, by the LTU, based at least in part on a physical layer identifier for the LTU, an LTU specific reference signal (LRS) comprising data for demodulating signals from the LTU, and transmitting, by the LTU, the LTU LRS. In some embodiments, transmitting, by the LTU, the subset of the LTU broadcast control signals while operating in the partial standalone mode may include transmitting a broadcast channel information signal comprising data representative of, for example, channel bandwidth for the LTU, and/or an LTU system frame number.

In some embodiments, producing the one or more LTU broadcast positioning reference signals may include generating a scrambling sequence using a pseudo-random sequence generator, wherein the pseudo-random sequence generator is initialized with a 31-bit initialization seed, $c'_{init}$, generated according to:

$$c'_{init} = 2^{28} \cdot \left\lfloor \frac{N_{ID}^{LTU}}{512} \right\rfloor + 2^{10} \cdot (7 \cdot (n_s + 1) + l + 1) \cdot (2 \cdot (N_{ID}^{LTU} \bmod 512) + 1) + 2 \cdot (N_{ID}^{LTU} \bmod 512) + N_{CP}$$

where $N_{ID}^{LTU}$ is a value derived, at least in part, based on an identifier of the LTU, $N_{CP}$ equals 1 for normal cyclic prefix and 0 for extended cyclic prefix, $n_s$ is a slot number within a radio frame with a value in a range of 0-19, and l is an OFDM symbol number within a slot.

In some implementations, producing the one or more LTU broadcast positioning reference signals may include producing the one or more LTU broadcast positioning reference signals based, in part, on a muting pattern indicated by a PRS muting bitstring with a bitstring-length of at least 32 bits.

With continued reference to FIG. 6, the procedure 600 further includes transmitting 620, by the LTU, the one or more LTU broadcast positioning reference signals (PRS) usable for determination of a position of the at least one mobile wireless device, with the one or more LTU broadcast positioning reference signals being detectable by the at least one mobile wireless device. In the embodiments of FIG. 6, at least some of the LTU broadcast control signals are transmittable by a different wireless node than the LTU. In some embodiments, transmitting the one or more LTU broadcast positioning reference signals may include scheduling the one or more LTU broadcast positioning reference signals within at least one transmission sub-frame, with the at least one transmission sub-frame associated with a plurality of symbols that are each associated with a plurality of sub-carriers. Scheduling the one or more LTU broadcast positioning reference signals within the at least one transmission sub-frame, while the LTU is operating in an integrated network mode in which the LTU is configured to operate within a network comprising at least one network node supporting uplink communication with the at least one mobile wireless device (with the at least one network node configured to transmit all or most of the LTU broadcast control signals), may include making available for scheduling of at least one of the one or more LTU broadcast positioning reference signals all of the plurality of symbols within the at least one transmission sub-frame, and selecting at least one of the all of the plurality of symbols available for the scheduling of the at least one of the one or more LTU broadcast positioning reference signals. Scheduling the one or more LTU broadcast positioning reference signals within the at least one transmission sub-frame, while the LTU is operating in a partial standalone mode in which the LTU is configured to operate independently from any network node supporting uplink communication with the at least one mobile wireless device, and in which one or more remote nodes, different from the LTU, transmit system information comprising data relating to the LTU, may include making available for scheduling of the at least one of the one or more LTU broadcast positioning reference signals a subset of the plurality of symbols that are within the at least one transmission sub-frame, with at least one of the plurality of symbols being allocated for transmission of control signaling for the LTU. In some embodiments, transmitting the one or more LTU broadcast positioning reference signals may include transmitting the one or more LTU broadcast positioning reference signals to support observed time difference of arrival (OTDOA) positioning operations. In such embodiments, OTDOA assistance data, used to support the OTDOA positioning operations, includes an indicator to indicate to the at least one mobile device that the OTDOA assistance is being provided for the LTU when the LTU is operating in an integrated network mode of operation in which the LTU is configured to operate within a network comprising at least one network node supporting uplink communication with the at least one mobile wireless device.

Figure 7:
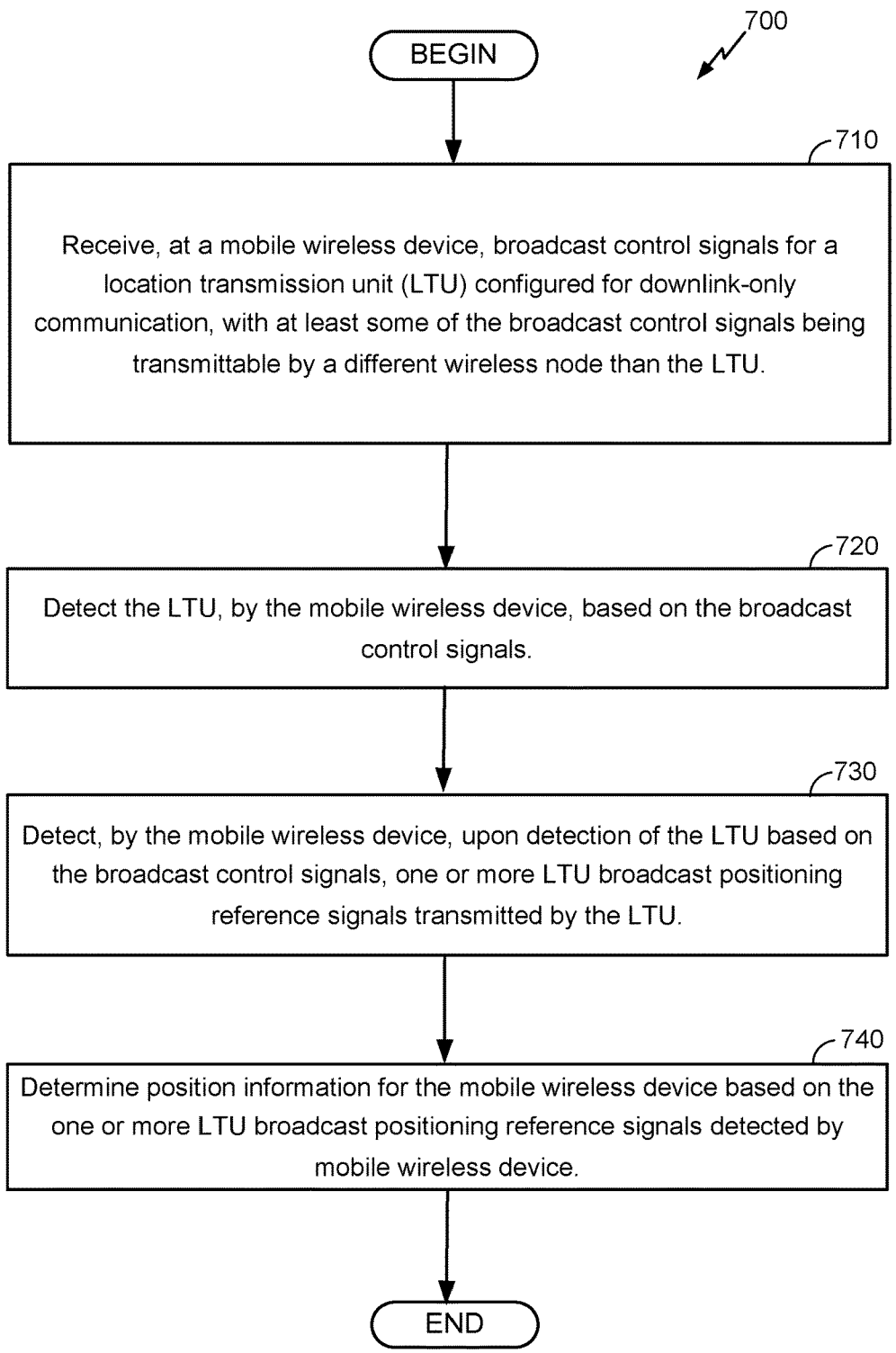
FIG. 7 is a flowchart of an example procedure, generally performed at a mobile wireless device (UE), to facilitate position determination operations.

With reference next to FIG. 7, a flowchart of an example procedure 700, generally performed at a mobile wireless device (UE), to facilitate position determination operation, is shown. The procedure 700 includes receiving 710, at a mobile wireless device (which may be similar to, in implementations and/or functionality, to the mobile devices 108 or 208 of FIGS. 1 and 2), broadcast control signals (such as synchronization signals, frame timing information, assistance data, and/or other types of control data) for a location transmission unit (LTU) configured for downlink-only communication, with at least some of the broadcast control signals being transmittable by a different wireless node than the LTU. As noted, the LTU may be configured to support multiple modes of operation, including: 1) a partial standalone mode in which one or more remote nodes, different from the LTU, transmit system information comprising data relating to the LTU while the LTU is configured to operate independently from any network node supporting uplink communication, and/or 2) an integrated network mode in which the LTU is configured to operate within a network comprising at least one network node supporting uplink communication, with the at least one network node configured to transmit all (or substantially all) of the LTU broadcast control signals. In some embodiments, the LTU may further be configured to support a full standalone mode of operation in which the LTU is configured to operate independently of any network node supporting uplink communication, and also configured to transmit all required broadcast control signals for detecting the LTU. Other modes of operation may also be supported by the LTU.

In some embodiments, receiving the LTU broadcast control signals, while the LTU is in partial standalone mode, may include receiving from the LTU, by the mobile wireless device, an LTU primary synchronization signal (PSS) and an LTU secondary synchronization signal (SSS), with the LTU SSS being derived at least in part based on the LTU PSS and an identification value assigned to the LTU. In such embodiments, the procedure may further include deriving, based on the LTU PSS and LTU SSS received by the mobile wireless device, LTU frame timing. The procedure may further include deriving, based on the LTU SSS received by the mobile wireless device, a physical layer identifier for the LTU. In some embodiments, receiving the broadcast control signals, while the LTU is in the partial standalone mode, may include receiving from the LTU, by the mobile wireless device, LTU specific reference signal (LRS) comprising data for demodulating, by the mobile wireless device, signals from the LTU. In some implementations, receiving the broadcast control signals, while the LTU is in the partial standalone mode, may include receiving, by the mobile wireless device, a broadcast channel information signal comprising data representative of, for example, a channel bandwidth for the LTU, and/or an LTU system frame number.

With continued reference to FIG. 7, the procedure 700 also includes detecting 720 the LTU, by the mobile wireless device, based on the broadcast control signals. Upon detection of the LTU based on the broadcast control signals, the mobile wireless device detects 730 one or more LTU broadcast positioning reference signals (PRS) transmitted by the LTU. In some embodiments, the one or more LTU broadcast positioning reference signals may be configured to be scheduled within a transmission frame based on the mode of operation of the LTU, with the transmission frame including a plurality of sub-frames that is each associated with a plurality of symbols, with each of the plurality of symbols associated with a plurality of sub-carriers. In some embodiments, detection of the one or more LTU PRS signals may include generating a scrambling sequence using a pseudo-random sequence generator, wherein the pseudo-random sequence generator is initialized with a 31-bit initialization seed, $c'_{init}$, generated according to $$c'_{init} = 2^{28} \cdot \left\lfloor \frac{N_{ID}^{LTU}}{512} \right\rfloor + 2^{10} \cdot (7 \cdot (n_s + 1) + l + 1) \cdot (2 \cdot (N_{ID}^{LTU} \bmod 512) + 1) + 2 \cdot (N_{ID}^{LTU} \bmod 512) + N_{CP},$$

where $N_{ID}^{LTU}$ is a value derived, at least in part, based on an identifier of the LTU, $N_{CP}$ equals 1 for normal cyclic prefix and 0 for extended cyclic prefix, $n_s$ is a slot number within a radio frame with a value in a range of 0-19, and l is an OFDM symbol number within a slot. Detection of the one or more LTU PRS signals may also include, in some implementations, detecting the one or more LTU broadcast positioning reference signals based, in part, on a muting pattern indicated by a PRS muting bitstring with a bitstring-length of at least 32 bits.

Based on the detected one or more LTU broadcast positioning reference signals detected by the mobile wireless device, position information for the mobile wireless device is determined 740. For example, as noted, in some embodiments the mobile device may implement an OTDOA procedure in which the mobile device is configured to (based, in part, on TBS system information and/or other assistance data it has received, with such information being provided, for example, as SFN offset from which PRS schedule for the various nodes transmitting PRS transmission can be derived) to measure and compute the difference in the arrival times of downlink radio signals (e.g., PRS transmissions from one or more LTU nodes, PRS transmissions from non-LTU nodes, and/or other types of radio signals). The computed arrival time differences (and/or other information, such as signal strength data, information regarding the signal quality for the transmission used to compute time differences, etc.) may then be used to compute, either locally at the mobile device, or at a remote location server (an E-SMLC server, such as the E-SMLC server 230 of FIG. 2) to which the mobile device communicates the time-difference data, to derive a location estimate for the mobile device (or for some other device). In some embodiments, determination of the position information for the mobile wireless device may also include receiving OTDOA assistance data, used to support the OTDOA positioning operations, including receiving an indicator to indicate to the at least one mobile device that the OTDOA assistance is being provided for the LTU when the LTU is operating in an integrated network mode of operation in which the LTU is configured to operate within a network comprising at least one network node supporting uplink communication.

Figure 8:
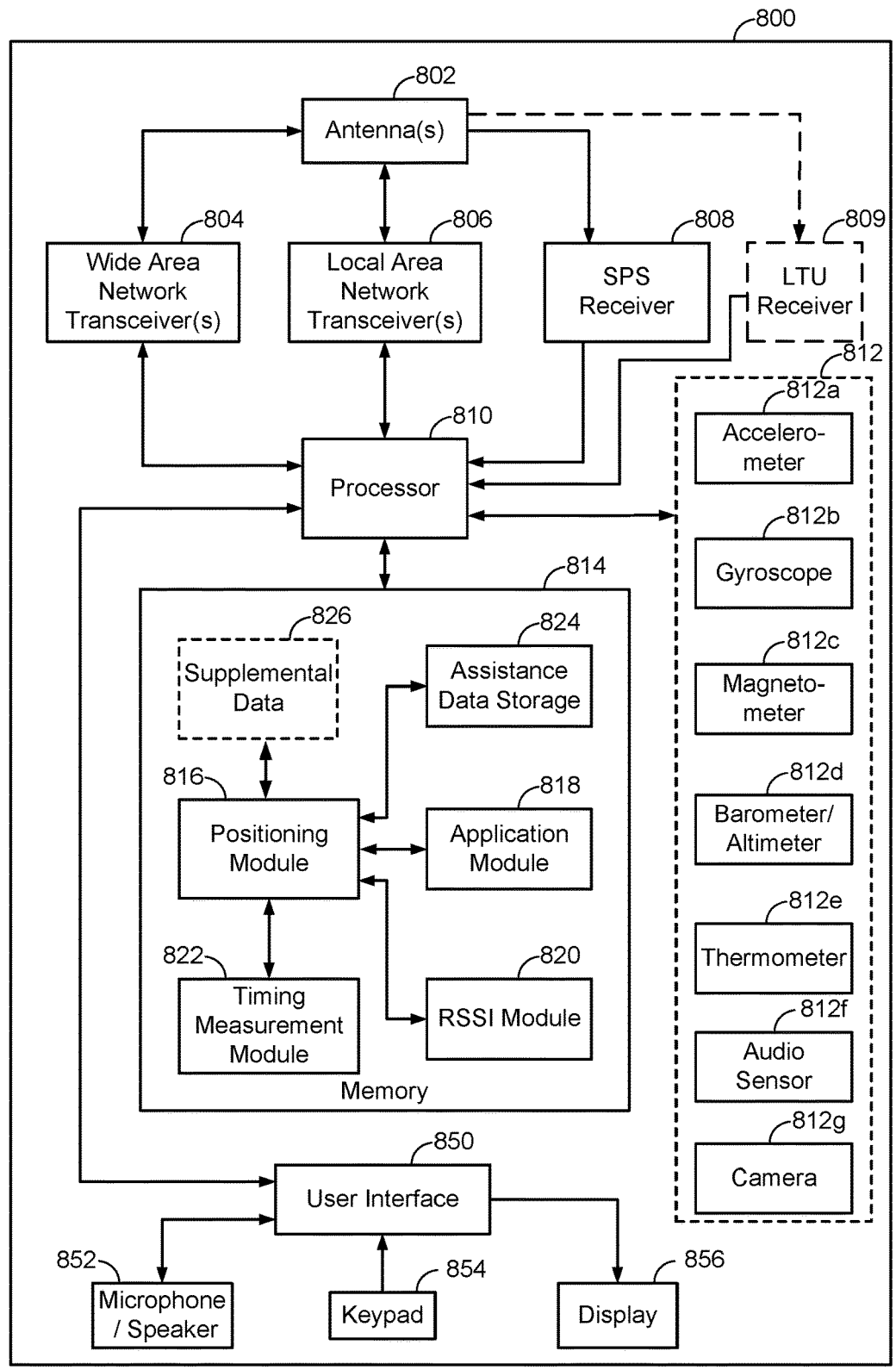
FIG. 8 is a schematic diagram of an example wireless device (e.g., UE).

With reference now to FIG. 8, a schematic diagram illustrating various components of an example wireless device 800 (e.g., a mobile device), which may be similar to or the same as the wireless devices 108 or 208 depicted in FIGS. 1 and 2, is shown. For the sake of simplicity, the various features/components/functions illustrated in the schematic boxes of FIG. 8 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 8 may be further subdivided, or two or more of the features or functions illustrated in FIG. 8 may be combined. Additionally, one or more of the features or functions illustrated in FIG. 8 may be excluded. In some embodiments, some or all of the components depicted in FIG. 8 may also be used in implementations of one or more of the wireless nodes 104a-c, 106a-e, and/or 120a-b, as well as the server 110 illustrated in FIG. 1. In such embodiments, the components depicted in FIG. 8 may be configured to cause the operations performed by devices (wireless devices, servers, such as location servers, etc.) as described herein (e.g., to transmit or receive LTU control signals and/or LTU position reference signals (PRS), and to determine location information based, at least in part, LTU PRS transmissions (for example, according to OTDOA processes, or other types of location-determination processes).

As shown, the wireless device 800 may include one or more local area network transceivers 806 that may be connected to one or more antennas 802. The one or more local area network transceivers 806 comprise suitable devices, circuits, hardware, and/or software for communicating with and/or detecting signals to/from one or more of the WLAN access points 106a-e depicted in FIG. 1, and/or directly with other wireless devices (e.g., mobile devices) within a network. In some embodiments, the local area network transceiver(s) 806 may comprise a WiFi (802.11x) communication transceiver suitable for communicating with one or more wireless access points; however, in some embodiments, the local area network transceiver(s) 806 may be configured to communicate with other types of local area networks, personal area networks (e.g., Bluetooth® wireless technology networks), etc. Additionally, any other type of wireless networking technologies may be used, for example, Ultra Wide Band, ZigBee, wireless USB, etc.

The wireless device 800 may also include, in some implementations, one or more wide area network transceiver(s) 804 that may be connected to the one or more antennas 802. The wide area network transceiver 804 may comprise suitable devices, circuits, hardware, and/or software for communicating with and/or detecting signals from one or more of, for example, the WWAN nodes 104*a-c* illustrated in FIG. 1 (which may be eNB nodes), the LTU's 120*a-b*, and/or directly with other wireless devices within a network. In some implementations, the wide area network transceiver(s) 804 may comprise a CDMA communication system suitable for communicating with a CDMA network of wireless base stations. In some implementations, the wireless communication system may comprise other types of cellular telephony networks, such as, for example, TDMA, GSM, WCDMA, LTE, etc. Additionally, any other type of wireless networking technologies may be used, including, for example, WiMax (802.16), etc. As also illustrated in FIG. 8, in some embodiments, the wireless device may optionally include a dedicated TBS receiver 809 (also referred to as an LTU receiver) configured to receive DL control signaling from deployed LTU's within range of the wireless device 800, based on which the wireless devices 800 may detect the LTU. The dedicated TBS (LTU) receiver 809 may further be configured to receive LTU PRS transmissions from those deployed LTU's based on which the wireless device 800 may derive location information. The receiver 809 may comprise suitable devices, circuits, hardware, and/or software for receiving, detecting, and/or processing signals from one or more of, LTU nodes 120*a-b* illustrated in FIG. 1. In some implementations, the receiver 809 may be part of the wide area network transceiver(s) 804, or local area network transceiver(s) 806 (for example, using the receiving functionality of transceivers 804, 806), or SPS receiver(s) 808. In some embodiments, receiving and detecting transmissions from LTU's may be performed by the transceiver 804 and/or 806 (as well as by the receiver 809 described herein).

In some embodiments, an SPS receiver (also referred to as a global navigation satellite system (GNSS) receiver) 808 may also be included with the wireless device 800. The SPS receiver 808 may be connected to the one or more antennas 802 for receiving satellite signals. The SPS receiver 808 may comprise any suitable hardware and/or software for receiving and processing SPS signals. The SPS receiver 808 may request information as appropriate from the other systems, and may perform the computations necessary to determine the position of the wireless device 800 using, in part, measurements obtained by any suitable SPS procedure. Additionally, measurement values for received satellite signals may be communicated to a location server configured to facilitate location determination.

As further illustrated in FIG. 8, the example wireless device 800 includes one or more sensors 812 coupled to a processor/controller 810. For example, the sensors 812 may include motion sensors to provide relative movement and/or orientation information (which is independent of motion data derived from signals received by the wide area network transceiver(s) 804, the local area network transceiver(s) 806, and/or the SPS receiver 808). By way of example but not limitation, the motion sensors may include an accelerometer 812*a*, a gyroscope 812*b*, and a geomagnetic (magnetometer) sensor 812*c* (e.g., a compass), any of which may be implemented based on micro-electro-mechanical-system (MEMS), or based on some other technology. The one or more sensors 812 may further include an altimeter (e.g., a barometric pressure altimeter) 812*d*, a thermometer (e.g., a thermistor) 812*e*, an audio sensor 812*f* (e.g., a microphone) and/or other sensors. The output of the one or more sensors 812 may be provided as data transmitted to a remote device or server (via the transceivers 804 and/or 806, or via some network port or interface of the device 800) for storage or further processing. As further shown in FIG. 8, in some embodiments, the one or more sensors 812 may also include a camera 812*g* (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of UV and/or infra-red illumination.

The processor(s) (also referred to as a controller) 810 may be connected to the local area network transceiver(s) 806, the wide area network transceiver(s) 804, the SPS receiver 808 (and, optionally, the receiver 809, when circuitry to detect LTU transmission is not already integrated, or otherwise configured, in the transceivers 804, 806, or the receiver 808), and the one or more sensors 812. The processor may include one or more microprocessors, microcontrollers, and/or digital signal processors that provide processing functions, as well as other calculation and control functionality. The processor 810 may be coupled to storage media (e.g., memory) 814 for storing data and software instructions for executing programmed functionality within the mobile device. The memory 814 may be on-board the processor 810 (e.g., within the same IC package), and/or the memory may be external memory to the processor and functionally coupled over a data bus. Further details regarding an example embodiment of a processor or computation system, which may be similar to the processor 810, are provided below in relation to FIG. 10.

A number of software modules and data tables may reside in memory 814 and may be utilized by the processor 810 in order to manage both communications with remote devices/nodes (such as the various nodes and/or the server 110 depicted in FIG. 1), perform positioning determination functionality, and/or perform device control functionality. As illustrated in FIG. 8, in some embodiments, the memory 814 may include a positioning module 816, an application module 818, a received signal strength indicator (RSSI) module 820, and/or a timing measurement module 822 to measure timing information in relation to received signals. It is to be noted that the functionality of the modules and/or data structures may be combined, separated, and/or be structured in different ways depending upon the implementation of the wireless device 800. For example, the RSSI module 820 and/or the timing measurement module 822 may each be realized, at least partially, as a hardware-based implementation, and may thus include such devices or circuits as a dedicated antenna (e.g., a dedicated timing measurement and/or an RSSI antenna), a dedicated processing unit to process and analyze signals received and/or transmitted via the antenna(s) (e.g., to determine signal strength of received signals, determine timing information in relation to signals and/or an RTT cycle, etc.)

The application module 818 may be a process running on the processor 810 of the wireless device 800, which requests position information from the positioning module 816, or which receives positioning/location data from a remote device (e.g., a remote location server). Applications typically run within an upper layer of the software architectures, and may include navigation applications, shopping applications, location aware service applications, etc. The positioning module/circuit 816 may derive the position of the wireless device 800 using information derived from various receivers and modules of the wireless device 800, e.g., based on signal strength measurements, and/or timing measurements (including timing measurements of LTU PRS transmissions received by the mobile device via, for example, its WWAN transceiver(s) 804, or the TBS/LTU receiver 809). Data derived by the positioning module 816 may be used to supplement location information provided, for example, by a remote device (such as a location server) or may be used in place of location data sent by a remote device. For example, positioning module 816 may determine a position of the device 800 (or positioning of some other remote device) based on measurements performed by various sensors, circuits, and/or modules of the wireless device 800, and use those measurements in conjunction with assistance data received from a remote server to determine location of the device 800 (the assistance data may include TBS system information, which, depending on a mode of operation an LTU node is configured to operate in, may have been communicated by the LTU or by a non-LTU/TBS node). The memory 814 may also include a module(s) to implement the processes described herein, e.g., a process to receive control signals/signal-acquisition signals (including to receive LTU control signals from one or more LTU's when, for example, they are configured to operate in full standalone mode or partial standalone mode), detect one or more LTU's based on control/signal-acquisition signals, receive/detect LTU PRS transmissions, and/or determine location information based on the received LTU PRS transmissions. Alternatively, the processes described herein may be implemented through the application module 818.

As further illustrated, the wireless device 800 may also include assistance data storage 824, where assistance data (which may have been received from a LTU node or from a non-LTU node), such as map information, data records relating to location information for various nodes in an area where the device is currently located, heatmaps, neighbor lists, etc., is stored. In some embodiments, the wireless device 800 may also be configured to receive supplemental information that includes auxiliary position and/or motion data which may be determined from other sources (e.g., from the one or more sensors 812). Such auxiliary position data may be incomplete or noisy, but may be useful as another source of independent information for estimating the position of the device 800, or for performing other operations or functions. Supplemental information may also include, but not be limited to, information that can be derived or based upon Bluetooth signals, beacons, RFID tags, and/or information derived from a map (e.g., receiving coordinates from a digital representation of a geographical map by, for example, a user interacting with a digital map). The supplemental information may optionally be stored in the storage module 826 schematically depicted in FIG. 8.

The wireless device 800 may further include a user interface 850 providing suitable interface systems, such as a microphone/speaker 852, a keypad 854, and a display 856 that allows user interaction with the device 800. The microphone/speaker 852 (which may be the same or different from the sensor 812*f*) provides for voice communication services (e.g., using the wide area network transceiver(s) 804 and/or the local area network transceiver(s) 806). The keypad 854 may comprise suitable buttons for user input. The display 856 may include a suitable display, such as, for example, a backlit LCD display, and may further include a touch screen display for additional user input modes.

Figure 9:
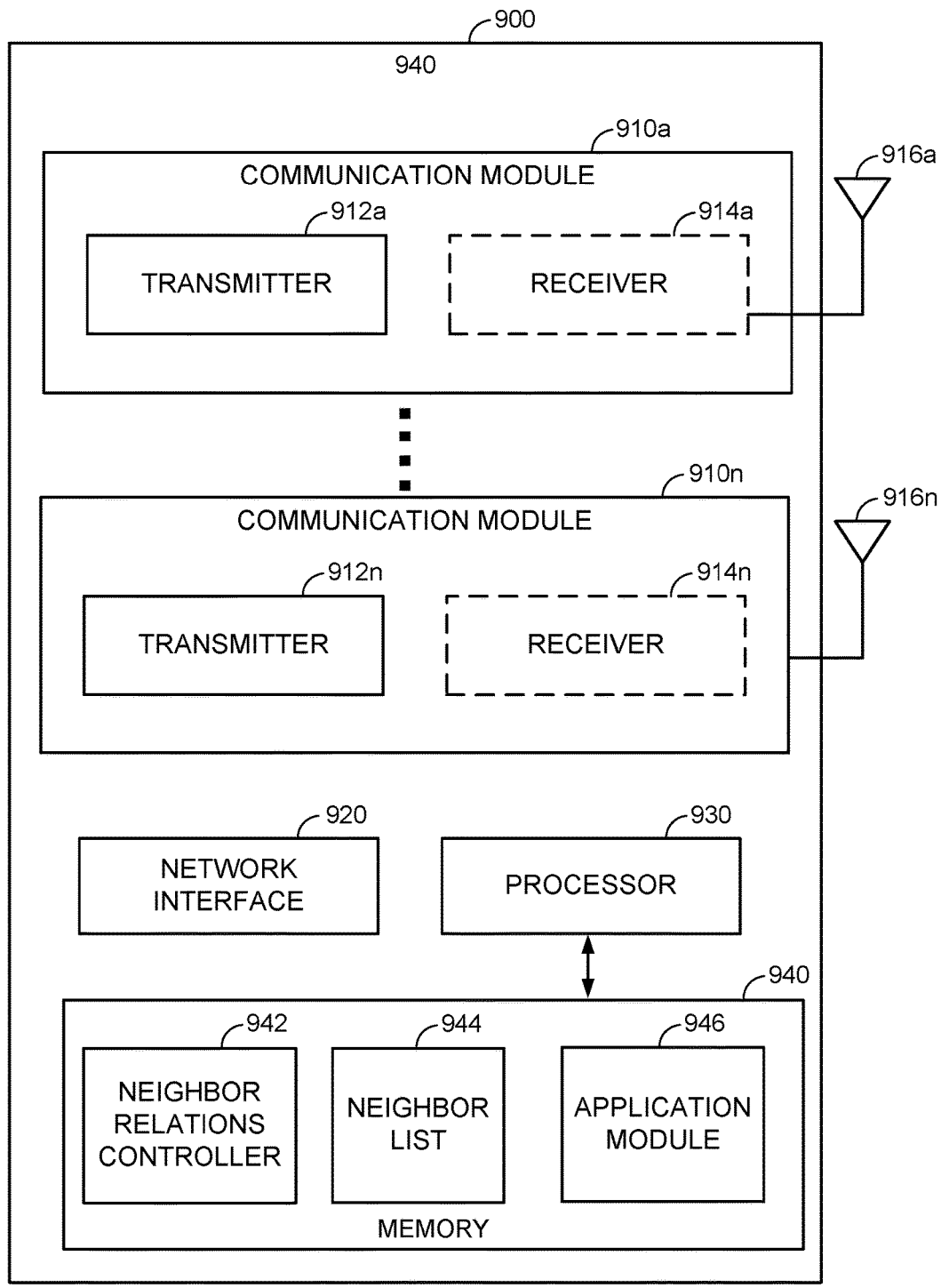
FIG. 9 is a schematic diagram of an example node (e.g., a base station, access point, LTU, etc.).

With reference now to FIG. 9, a schematic diagram of an example wireless node 900, such as access point (e.g., a base station), which may be similar to, and be configured to have a functionality similar to that, of any of the various nodes depicted in FIG. 1 (e.g., the nodes 104*a-c* and/or 106*a-e*, the LTU's 120*a-b*, and/or the server 110), or the devices illustrated in FIG. 2, is shown. The node 900 may include one or more communication modules 910*a-n* electrically coupled to one more antennas 916*a-n* for communicating with wireless devices, such as, for example, the mobile wireless devices 108, 208, or 800 of FIGS. 1, 2, and 8, respectively. The each of the communication modules 910*a*-910*n* may include a respective transmitter 912*a-n* for sending signals (e.g., downlink messages) and, optionally (e.g., for nodes configured to receive and process uplink communications, such as the nodes 104*a-c* and 106*a-e* of FIG. 1, or the eNode B 210 of FIG. 2) a respective receiver 914*a-n* (such receivers may not be required for operation of LTU nodes). In embodiments in which the implemented node includes both a transmitter and a receiver, the communication module comprising the transmitter and receiver may be referred to as a transceiver. The node 900 may also include a network interface 920 to communicate with other network nodes (e.g., sending and receiving queries and responses). For example, each network element may be configured to communicate (e.g., wired or wireless backhaul communication) with a gateway, or other suitable device of a network, to facilitate communication with one or more core network nodes (e.g., any of the other wireless nodes shown in FIG. 1, the server 110, and/or other network devices or nodes). Additionally and/or alternatively, communication with other network nodes may also be performed using the communication modules 910*a-n* and/or the respective antennas 916*a-n*.

The node 900 may also include other components that may be used with embodiments described herein. For example, the node 900 may include, in some embodiments, a processor (also referred to as a controller) 930 (which may be similar to the processor 810 of FIG. 8) to manage communications with other nodes (e.g., sending and receiving messages) and to provide other related functionality, including functionality to implement the various processes and methods described herein. The processor 930 may be coupled to (or otherwise communicate with) a memory 940, which may include one or more modules (implemented in hardware of software) to facilitate controlling the operation of the node 900. For example, the memory 940 may include an application module 946 (which may be similar to the application module 818 of FIG. 8) with computer code for various applications required to perform the operation of the node 900. For example, the processor 930 may be configured (e.g., using code provided via the application module 946, or some other module in the memory 940) to control the operation of the antennas 916*a-n* so as to adjustably control the antennas' transmission power and phase, gain pattern, antenna direction (e.g., the direction at which a resultant radiation beam from the antennas 916*a-n* propagates), antenna diversity, and other adjustable antenna parameters for the antennas 916*a-n* of the node 900. In some embodiments, the antennas' configuration may be controlled according to pre-stored configuration data provided at the time of manufacture or deployment of the node 900, or according to data obtain from a remote device (such as a central server sending data representative of the antenna configuration, and other operational parameters, that are to be used for the node 900). In some embodiments, the node 900 may be configured (e.g., through operation of the processor 930 and the memory 940) as a LTU, and may broadcast (downlink-only) wireless transmissions that include DL control signaling (based on which receiving wireless devices may detect the LTU), and may also transmit LTU PRS transmission based on which the receiving wireless devices may derive location information. The node 900 may also be configured (e.g., through operation of the processor 930 and the memory 940), in some implementations, to perform location data services, or performs other types of services, for multiple wireless devices (clients) communicating with the node 900 (or communicating with a server coupled to the node 900), and to provide location data and/or assistance data (e.g., including TBS system information) to such multiple wireless devices.

In addition, in some embodiments, the memory 940 may also include neighbor relations controllers (e.g., neighbor discovery modules) 942 to manage neighbor relations (e.g., maintaining a neighbor list 944) and to provide other related functionality. The processor 930 may be implemented, in some embodiments with a configuration and functionality similar to that shown and described in relation to FIG. 10. In some embodiments, the node may also include one or more sensors (not shown), such as any of the one or more sensors 812 of the wireless device 800 depicted in FIG. 8.

Figure 10:
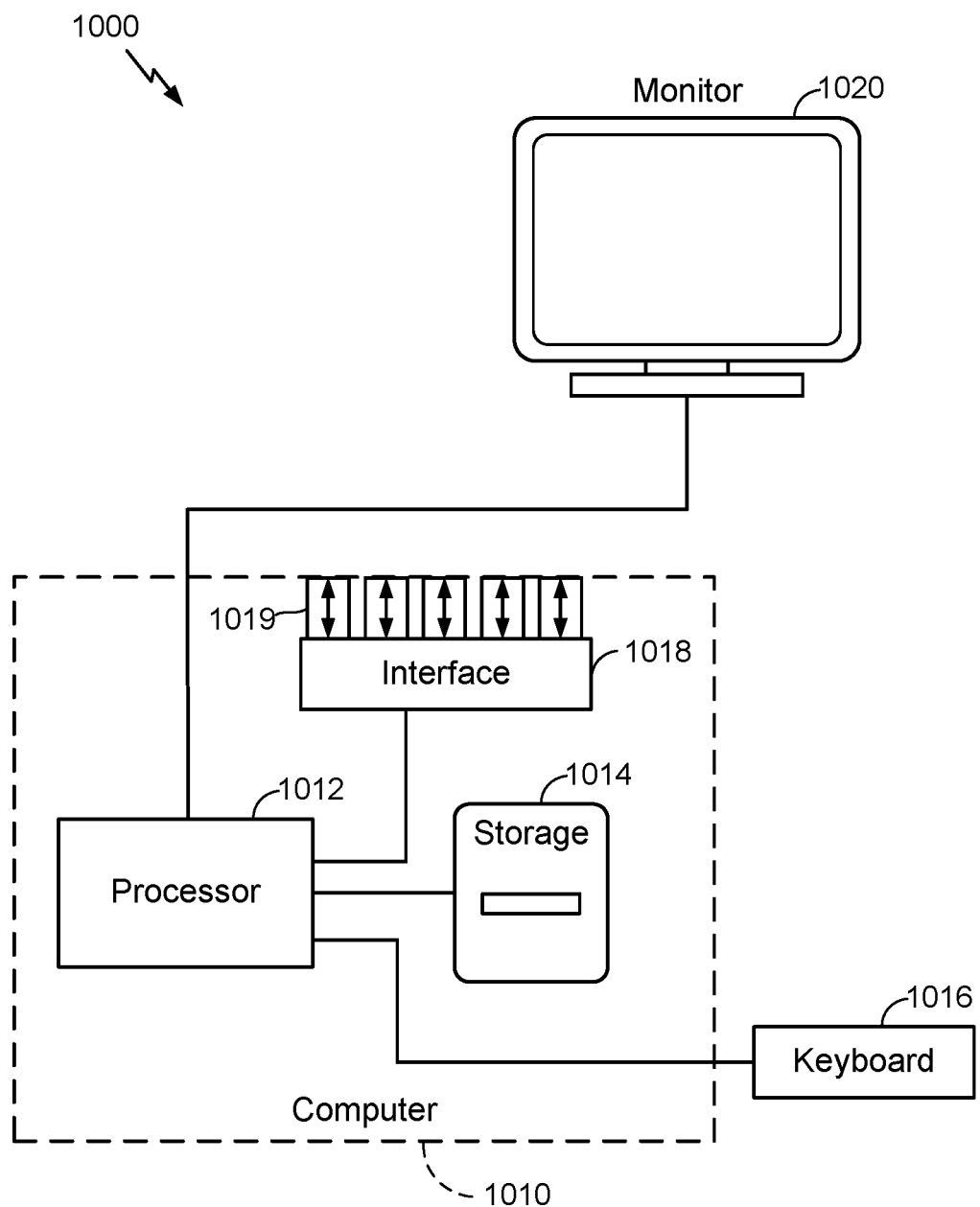
FIG. 10 is a schematic diagram of an example computing system.

Performing the procedures described herein may also be facilitated by a processor-based computing system. With reference to FIG. 10, a schematic diagram of an example computing system 1000 is shown. The computing system 1000 may be housed in, for example, a wireless device such as the devices 108, 208, and 800 of FIGS. 1, 2, and 8, and/or may comprise at least part of, or all of, wireless devices, servers, nodes, access points, or base stations (including location transmission unit nodes), such as the nodes 104*a-b*, 106*a-c*, 120*a-b*, 210, 220, and 900 depicted in FIGS. 1, 2, and 9. The computing system 1000 includes a computing-based device 1010 such as a personal computer, a specialized computing device, a controller, and so forth, that typically includes a central processor unit (CPU) 1012. In addition to the CPU 1012, the system includes main memory, cache memory and bus interface circuits (not shown). The computing-based device 1010 may include a mass storage device 1014, such as a hard drive and/or a flash drive associated with the computer system. The computing system 1000 may further include a keyboard, or keypad, 1016, and a monitor 1020, e.g., a CRT (cathode ray tube), LCD (liquid crystal display) monitor, etc., that may be placed where a user can access them (e.g., a mobile device's screen).

The computing-based device 1010 is configured to facilitate, for example, the implementation of one or more of the processes/procedures described herein, including the process to transmit and/or receive signal-acquisition signaling and LTU PRS transmissions, and to determine location information based on LTU PRS transmissions. The mass storage device 1014 may thus include a computer program product that, when executed on the computing-based device 1010, causes the computing-based device to perform operations to facilitate the implementation of the procedures described herein. The computing-based device may further include peripheral devices to implement input/output functionality. Such peripheral devices may include, for example, a CD-ROM drive and/or flash drive, or a network connection, for downloading related content to the connected system. Such peripheral devices may also be used for downloading software containing computer instructions to implement general operation of the respective system/device. For example, as illustrated in FIG. 10, the computing-based device 1010 may include an interface 1018 with one or more interfacing circuits (e.g., a wireless port that include transceiver circuitry, a network port with circuitry to interface with one or more network device, etc.) to provide/implement communication with remote devices (e.g., so that a wireless device, such as any of the wireless devices or nodes depicted in any of the figures, could communicate, via a port, such as the port 1019, with another device or node). Alternatively and/or additionally, in some embodiments, special purpose logic circuitry, e.g., an FPGA (field programmable gate array), a DSP processor, an ASIC (application-specific integrated circuit), or other types of circuit-based and hardware arrangements may be used in the implementation of the computing system 1000. Other modules that may be included with the computing-based device 1010 are speakers, a sound card, a pointing device, e.g., a mouse or a trackball, by which the user can provide input to the computing system 1000. The computing-based device 1010 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device 1010 or external to the device. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically (e.g., with lasers). Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method to facilitate position determination operations, the method comprising:
   producing, by a location transmission unit (LTU) configured for downlink-only communication, one or more subframes comprising one or more LTU broadcast positioning reference signals, wherein one or more signals transmitted by the LTU are configured to be detected by at least one mobile wireless device based on LTU broadcast control signals, with at least some of the LTU broadcast control signals being configured to be transmitted by a different wireless node than the LTU; and
   transmitting, by the LTU, the one or more LTU broadcast positioning reference signals configured for use in determining a position of the at least one mobile wireless device, the one or more LTU broadcast positioning reference signals being configured to be detected by the at least one mobile wireless device.

2. The method of claim 1, wherein the LTU is configured to support multiple modes of operation, including: 1) a partial standalone mode in which one or more remote nodes, different from the LTU, transmit system information comprising data relating to the LTU while the LTU is configured to operate independently from any network node supporting uplink communication with the at least one mobile wireless device, or 2) an integrated network mode in which the LTU is configured to operate within a network comprising at least one network node supporting uplink communication with the at least one mobile wireless device, with the at least one network node configured to transmit all the LTU broadcast control signals.

3. The method of claim 2, further comprising:
   transmitting, by the LTU while the LTU is operating in the partial standalone mode, a subset of the LTU broadcast control signals.

4. The method of claim 3, wherein transmitting, by the LTU, the subset of the LTU broadcast control signals while operating in the partial standalone mode comprises:
   transmitting an LTU primary synchronization signal (PSS) and an LTU secondary synchronization signal (SSS), the LTU SSS derived at least in part based on the LTU PSS and an identification value assigned to the LTU, wherein the LTU PSS and the LTU SSS are configured to be detected by the at least one mobile wireless device and configured to support determination of LTU frame timing, and wherein the LTU SSS is configured to be used to determine a physical layer identifier for the LTU.

5. The method of claim 3, wherein transmitting, by the LTU, the subset of the LTU broadcast control signals while operating in the partial standalone mode comprises:
   deriving, by the LTU, based at least in part on a physical layer identifier for the LTU, an LTU specific reference signal (LRS) comprising data for demodulating signals from the LTU; and
   transmitting, by the LTU, the LTU LRS.

6. The method of claim 3, wherein transmitting, by the LTU, the subset of the LTU broadcast control signals while operating in the partial standalone mode comprises:

transmitting, by the LTU, a broadcast channel information signal comprising data representative of: channel bandwidth for the LTU, or an LTU system frame number, or any combination thereof.

7. The method of claim 1, wherein transmitting the one or more LTU broadcast positioning reference signals comprises:
scheduling the one or more LTU broadcast positioning reference signals within at least one transmission sub-frame, the at least one transmission sub-frame associated with a plurality of symbols that are each associated with a plurality of sub-carriers.

8. The method of claim 7, wherein scheduling the one or more LTU broadcast positioning reference signals within the at least one transmission sub-frame, while the LTU is operating in an integrated network mode in which the LTU is configured to operate within a network comprising at least one network node supporting uplink communication with the at least one mobile wireless device, comprises:
making available for scheduling of at least one of the one or more LTU broadcast positioning reference signals all of the plurality of symbols within the at least one transmission sub-frame; and
selecting at least one of the all of the plurality of symbols available for the scheduling of the at least one of the one or more LTU broadcast positioning reference signals.

9. The method of claim 7, wherein scheduling the one or more LTU broadcast positioning reference signals within the at least one transmission sub-frame, while the LTU is operating in a partial standalone mode in which the LTU is configured to operate independently from any network node supporting uplink communication with the at least one mobile wireless device, and in which one or more remote nodes, different from the LTU, transmit system information comprising data relating to the LTU, comprises:
making available for scheduling of the at least one of the one or more LTU broadcast positioning reference signals a subset of the plurality of symbols that are within the at least one transmission sub-frame, with at least one of the plurality of symbols being allocated for transmission of control signaling for the LTU.

10. The method of claim 1, wherein producing the one or more LTU broadcast positioning reference signals comprises:
generating a scrambling sequence using a pseudo-random sequence generator, wherein the pseudo-random sequence generator is initialized with a 31-bit initialization seed, $c'_{init}$, generated according to:

$$c'_{init} = 2^{28} \cdot \left\lfloor \frac{N_{ID}^{LTU}}{512} \right\rfloor + 2^{10} \cdot (7 \cdot (n_s + 1) + l + 1) \cdot (2 \cdot (N_{ID}^{LTU} \bmod 512) + 1) + 2 \cdot (N_{ID}^{LTU} \bmod 512) + N_{CP}$$

where $N_{ID}^{LTU}$ is a value derived, at least in part, based on an identifier of the LTU, $N_{CP}$ equals 1 for normal cyclic prefix and 0 for extended cyclic prefix, $n_s$ is a slot number within a radio frame with a value in a range of 0-19, and l is an OFDM symbol number within a slot.

11. The method of claim 1, wherein producing the one or more LTU broadcast positioning reference signals comprises:
producing the one or more LTU broadcast positioning reference signals based, in part, on a muting pattern indicated by a PRS muting bitstring with a bitstring-length of at least 32 bits.

12. The method of claim 1, wherein transmitting the one or more LTU broadcast positioning reference signals comprises:
transmitting the one or more LTU broadcast positioning reference signals to support observed time difference of arrival (OTDOA) positioning operations.

13. The method of claim 12, wherein OTDOA assistance data, used to support the OTDOA positioning operations, includes an indicator to indicate to the at least one mobile wireless device that the OTDOA assistance is being provided for the LTU when the LTU is operating in an integrated network mode of operation in which the LTU is configured to operate within a network comprising at least one network node supporting uplink communication with the at least one mobile wireless device.

14. A location transmission unit (LTU), comprising:
one or more processors, configured to:
produce one or more subframes comprising one or more LTU broadcast positioning reference signals, wherein the LTU is configured for downlink-only communication, and wherein one or more signals transmitted by the LTU are configured to be detected by at least one mobile wireless device based on LTU broadcast control signals, with at least some of the LTU broadcast control signals being configured to be transmitted by a different wireless node than the LTU; and
a transmitter, coupled to the one or more processors, configured to:
transmit the one or more LTU broadcast positioning reference signals configured for use in determining a position of the at least one mobile wireless device, the one or more LTU broadcast positioning reference signals being configured to be detected by the at least one mobile wireless device.

15. The LTU of claim 14, wherein the LTU is configured to support multiple modes of operation, including: 1) a partial standalone mode in which one or more remote nodes, different from the LTU, transmit system information comprising data relating to the LTU while the LTU is configured to operate independently from any network node supporting uplink communication with the at least one mobile wireless device, or 2) an integrated network mode in which the LTU is configured to operate within a network comprising at least one network node supporting uplink communication with the at least one mobile wireless device, with the at least one network node configured to transmit all the LTU broadcast control signals.

16. The LTU of claim 15, wherein the transmitter is further configured to:
transmit, while the LTU is operating in the partial standalone mode, a subset of the LTU broadcast control signals.

17. The LTU of claim 16, wherein the transmitter configured to transmit the subset of the LTU broadcast control signals, while the LTU is operating in the partial standalone mode, is configured to:
transmit an LTU primary synchronization signal (PSS) and an LTU secondary synchronization signal (SSS), the LTU SSS derived at least in part based on the LTU PSS and an identification value assigned to the LTU, wherein the LTU PSS and the LTU SSS are configured to be detected by the at least one mobile wireless device and configured to support determination of LTU frame timing, and wherein the LTU SSS is configured to be used to determine a physical layer identifier for the LTU.

18. The LTU of claim 16, wherein the one or more processors are further configured to:
derive, based at least in part on a physical layer identifier for the LTU, an LTU specific reference signal (LRS) comprising data for demodulating signals from the LTU;
wherein the transmitter configured to transmit the subset of the LTU broadcast control signals, while the LTU is operating in the partial standalone mode, is configured to:
transmit, by the LTU, the LTU LRS.

19. The LTU of claim 16, wherein the transmitter configured to transmit the subset of the LTU broadcast control signals, while the LTU is operating in the partial standalone mode, is configured to:
transmit a broadcast channel information signal comprising data representative of:
channel bandwidth for the LTU, or an LTU system frame number, or any combination thereof.

20. The LTU of claim 14, wherein the transmitter configured to transmit the one or more LTU broadcast positioning reference signals is configured to:
schedule the one or more LTU broadcast positioning reference signals within at least one transmission sub-frame, the at least one transmission sub-frame associated with a plurality of symbols that are each associated with a plurality of sub-carriers.

21. The LTU of claim 20, wherein the transmitter configured to schedule the one or more LTU broadcast positioning reference signals within the at least one transmission sub-frame, while the LTU is operating in an integrated network mode in which the LTU is configured to operate within a network comprising at least one network node supporting uplink communication with the at least one mobile wireless device, with the at least one network node configured to transmit all the LTU broadcast control signals, is configured to:
make available for scheduling of at least one of the one or more LTU broadcast positioning reference signals all of the plurality of symbols within the at least one transmission sub-frame; and
select at least one of the all of the plurality of symbols available for the scheduling of the at least one of the one or more LTU broadcast positioning reference signals.

22. The LTU of claim 20, wherein the transmitter configured to schedule the one or more LTU broadcast positioning reference signals within the at least one transmission sub-frame, while the LTU is operating in a partial standalone mode in which the LTU is configured to operate independently from any network node supporting uplink communication with the at least one mobile wireless device, and in which one or more remote nodes, different from the LTU, transmit system information comprising data relating to the LTU, is configured to:
make available for scheduling of the at least one of the one or more LTU broadcast positioning reference signals a subset of the plurality of symbols that are within the at least one transmission sub-frame, with at least one of the plurality of symbols being allocated for transmission of control signaling for the LTU.

23. The LTU of claim 14, wherein the one or more processors configured to produce the one or more LTU broadcast positioning reference signals are configured to:
generate a scrambling sequence using a pseudo-random sequence generator, wherein the pseudo-random sequence generator is initialized with a 31-bit initialization seed, $c'_{init}$, generated according to:

$$c'_{init} = 2^{28} \cdot \left\lfloor \frac{N_{ID}^{LTU}}{512} \right\rfloor + 2^{10} \cdot (7 \cdot (n_s + 1) + l + 1) \cdot (2 \cdot (N_{ID}^{LTU} \bmod 512) + 1) + 2 \cdot (N_{ID}^{LTU} \bmod 512) + N_{CP}$$

where $N_{ID}^{LTU}$ is a value derived, at least in part, based on an identifier of the LTU, $N_{CP}$ equals 1 for normal cyclic prefix and 0 for extended cyclic prefix, $n_s$ is a slot number within a radio frame with a value in a range of 0-19, and l is an OFDM symbol number within a slot.

24. The LTU of claim 14, wherein the one or more processors configured to produce the one or more LTU broadcast positioning reference signals are configured to:
produce the one or more LTU broadcast positioning reference signals based, in part, on a muting pattern indicated by a PRS muting bitstring with a bitstring-length of at least 32 bits.

25. The LTU of claim 14, wherein the transmitter configured to transmit the one or more LTU broadcast positioning reference signals is configured to:
transmit the one or more LTU broadcast positioning reference signals to support observed time difference of arrival (OTDOA) positioning operations.

26. The LTU of claim 25, wherein OTDOA assistance data, used to support the OTDOA positioning operations, includes an indicator to indicate to the at least one mobile wireless device that the OTDOA assistance is being provided for the LTU when the LTU is operating in an integrated network mode of operation in which the LTU is configured to operate within a network comprising at least one network node supporting uplink communication with the at least one mobile wireless device, with the at least one network node configured to transmit all the LTU broadcast control signals.

27. An apparatus to facilitate position determination operations, the apparatus comprising:
means for producing, by a location transmission unit (LTU) configured for downlink-only communication, one or more subframes comprising one or more LTU broadcast positioning reference signals, wherein one or more signals transmitted by the LTU are configured to be detected by at least one mobile wireless device based on LTU broadcast control signals, with at least some of the LTU broadcast control signals being configured to be transmitted by a different wireless node than the LTU; and
means for transmitting, by the LTU, the one or more LTU broadcast positioning reference signals configured to be detected a position of the at least one mobile wireless device, the one or more LTU broadcast positioning reference signals being configured to be detected by the at least one mobile wireless device.

28. The apparatus of claim 27, wherein the LTU is configured to support multiple modes of operation, including: 1) a partial standalone mode in which one or more remote nodes, different from the LTU, transmit system information comprising data relating to the LTU while the LTU is configured to operate independently from any network node supporting uplink communication with the at least one mobile wireless device, or 2) an integrated network mode in which the LTU is configured to operate within a network comprising at least one network node supporting uplink communication with the at least one mobile wireless device, with the at least one network node configured to transmit all the LTU broadcast control signals.

29. The apparatus of claim 28, further comprising means for transmitting, by the LTU while the LTU is operating in the partial standalone mode, a subset of the LTU broadcast control signals, including:
1) means for transmitting an LTU primary synchronization signal (PSS) and an LTU secondary synchronization signal (SSS), the LTU SSS derived at least in part based on the LTU PSS and an identification value assigned to the LTU, wherein the LTU PSS and the LTU SSS are configured to be detected by the at least one mobile wireless device and configured to support determination of LTU frame timing, and wherein the LTU SSS is configured to be used to determine a physical layer identifier for the LTU;
2) means for deriving, by the LTU, based at least in part on a physical layer identifier for the LTU, an LTU specific reference signal (LRS) comprising data for demodulating signals from the LTU, and means for transmitting, by the LTU, the LTU LRS; or
3) means for transmitting, by the LTU, a broadcast channel information signal comprising data representative of: channel bandwidth for the LTU, or an LTU system frame number, or any combination thereof; or any combination thereof.

30. A non-transitory computer readable media programmed with instructions, executable on a processor, to:
produce, by a location transmission unit (LTU) configured for downlink-only communication, one or more subframes comprising one or more LTU broadcast positioning reference signals, wherein one or more signals transmitted the LTU are configured to be detected by at least one mobile wireless device based on LTU broadcast control signals, with at least some of the LTU broadcast control signals being configured to be transmitted by a different wireless node than the LTU; and
transmit, by the LTU, the one or more LTU broadcast positioning reference signals configured for use in determining a position of the at least one mobile wireless device, the one or more LTU broadcast positioning reference signals being configured to be detected by the at least one mobile wireless device.

* * * * *